(12) United States Patent
Aoki et al.

(10) Patent No.: US 7,599,150 B2
(45) Date of Patent: Oct. 6, 2009

(54) HEAD STACK ASSEMBLY, ITS MANUFACTURING METHOD, AND MAGNETIC DISC DRIVE HAVING THE SAME

(75) Inventors: Kenichiro Aoki, Kawasaki (JP);
Toshiyuki Nakada, Kawasaki (JP); Keiji Aruga, Kawasaki (JP); Yoshiaki Nagasawa, Kawasaki (JP); Nobuyuki Hirono, Kawasaki (JP); Yasuhiro Hamada, Kawasaki (JP); Makoto Sakairi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 582 days.

(21) Appl. No.: 11/208,570

(22) Filed: Aug. 23, 2005

(65) Prior Publication Data
US 2006/0221506 A1 Oct. 5, 2006

(30) Foreign Application Priority Data

| Mar. 30, 2005 | (JP) | ............................. 2005-100198 |
| Mar. 30, 2005 | (JP) | ............................. 2005-100199 |
| Mar. 30, 2005 | (JP) | ............................. 2005-100200 |
| Mar. 30, 2005 | (JP) | ............................. 2005-100201 |

(51) Int. Cl.
*G11B 5/48* (2006.01)
(52) U.S. Cl. .................................................. 360/265.7
(58) Field of Classification Search .............. 360/265.7, 360/244.2, 244.6, 244.5; 29/603.03
See application file for complete search history.

(56) References Cited

U.S. PATENT DOCUMENTS 5,461,524 A * 10/1995 Jurgenson ................ 360/244.6

(Continued)

FOREIGN PATENT DOCUMENTS

EP 0 536 891 B1 2/1997

(Continued)

OTHER PUBLICATIONS

Korean Office Action dated Oct. 27, 2006.

*Primary Examiner*—Allen T Cao
(74) *Attorney, Agent, or Firm*—Kratz, Quintos & Hanson, LLP

(57) ABSTRACT

A method for manufacturing a head stack assembly that includes a pair of suspensions each of which supports a head, an arm that drives the head, and a pair of base plates that attach the pair of suspensions to both sides of the arm that has a perforation hole, each of the pair of base plates having a boss with an opening includes the step of swaging the pair of base plates with the arm by passing, in one direction, a processing member larger than the opening through the perforation hole and the base plates while the pair of base plates are being inserted into the perforation hole at both sides of the perforation hole, wherein where a neutral plane is defined as a plane that halves a thickness of the arm and is perpendicular to a section that includes a center axis of the perforation hole, a first position is defined as a position that has a minimum internal diameter of the base plate, and a second position is defined as a position closest to the neutral plane among contact positions between the base plates and the arm, a distance between the neutral plane and the first position is equal to or smaller than a distance between the neutral plane and the second position before the swaging step.

26 Claims, 26 Drawing Sheets

U.S. PATENT DOCUMENTS

| | | | |
|---|---|---|---|
| 5,602,698 A | 2/1997 | Miyazaki et al. | 360/104 |
| 5,604,649 A | 2/1997 | Hernandez | 360/104 |
| 5,717,545 A * | 2/1998 | Brooks et al. | 360/244.6 |
| 5,949,615 A | 9/1999 | Hernandez | 360/104 |
| 5,963,383 A * | 10/1999 | Jurgenson | 360/244.6 |
| 7,042,680 B1 | 5/2006 | Zhang et al. | 360/244.6 |
| 7,130,156 B1 * | 10/2006 | Fossum | 360/244.6 |
| 2006/0174472 A1 * | 8/2006 | Zhang et al. | 29/603.03 |

FOREIGN PATENT DOCUMENTS

| | | |
|---|---|---|
| JP | 4-111050 | 9/1992 |
| JP | 5-74086 | 3/1993 |
| JP | 7-192420 | 7/1995 |
| JP | 7-211020 | 8/1995 |
| JP | 7-286609 | 10/1995 |
| JP | 9-63219 | 3/1997 |
| JP | 2003-303481 | 10/2003 |
| KR | 1999-0060615 | 7/1999 |

* cited by examiner

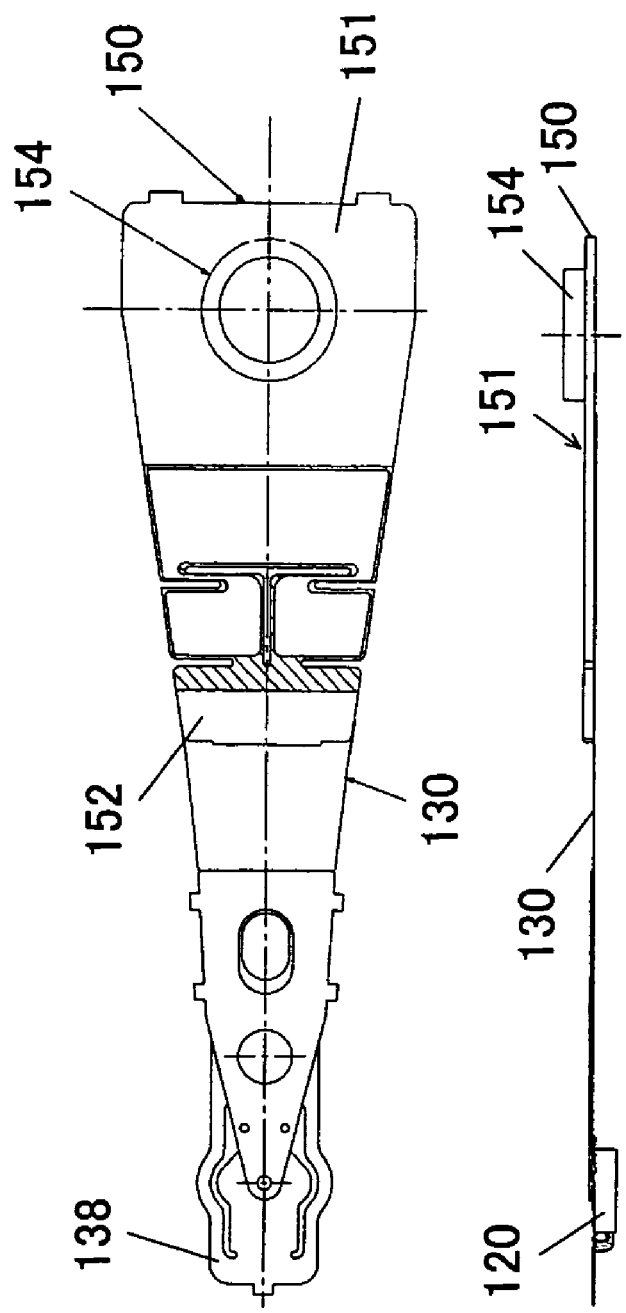

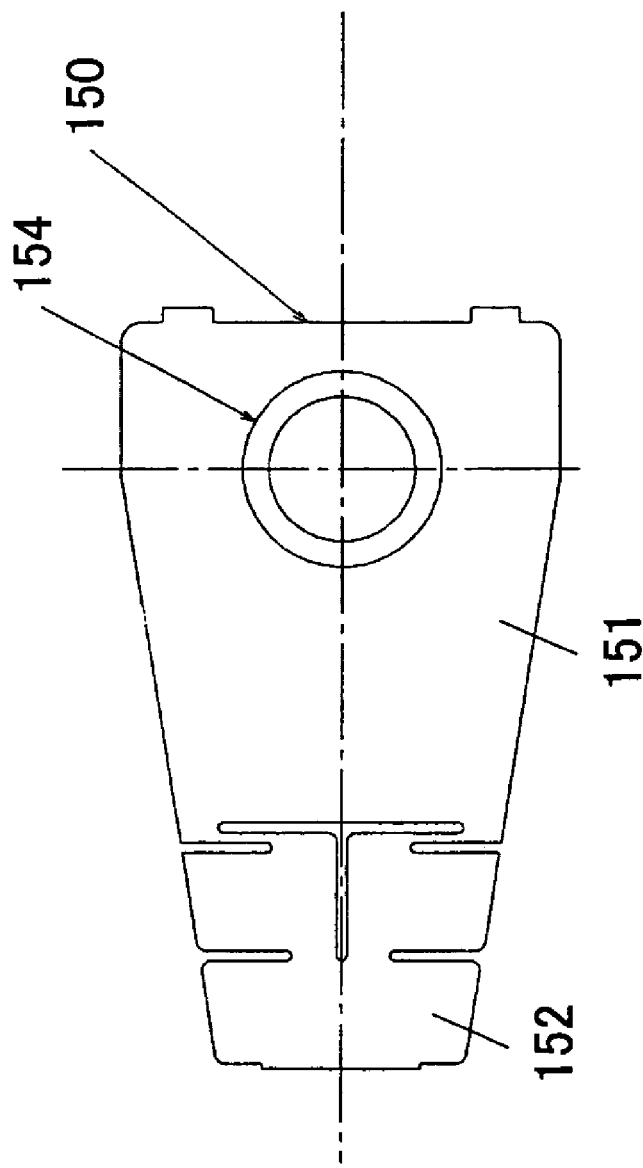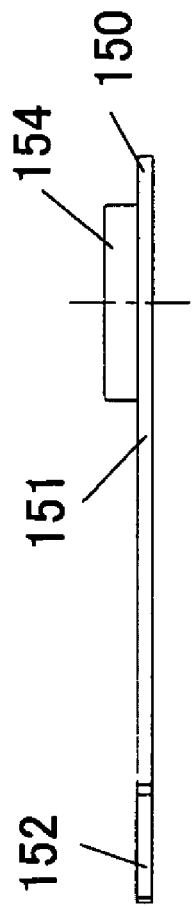
FIG. 5A
FIG. 5B

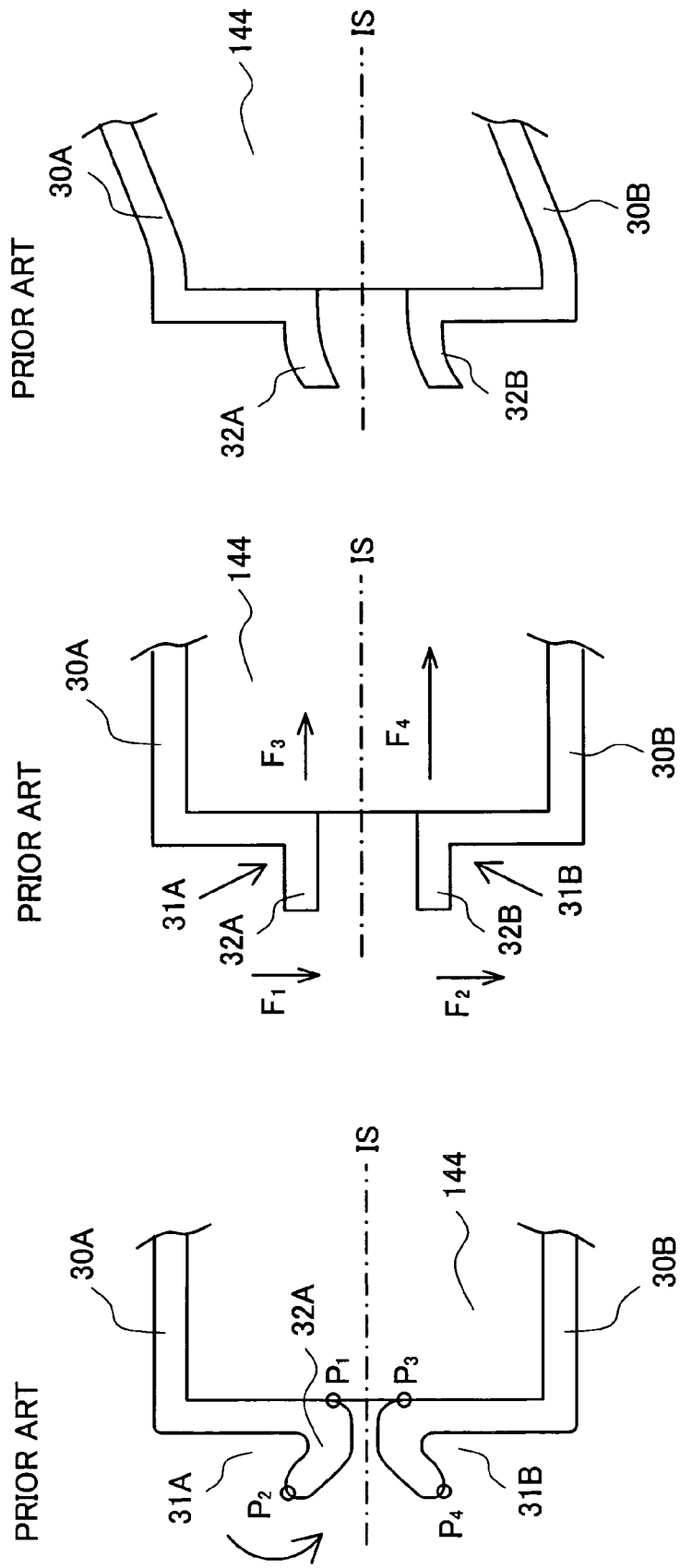

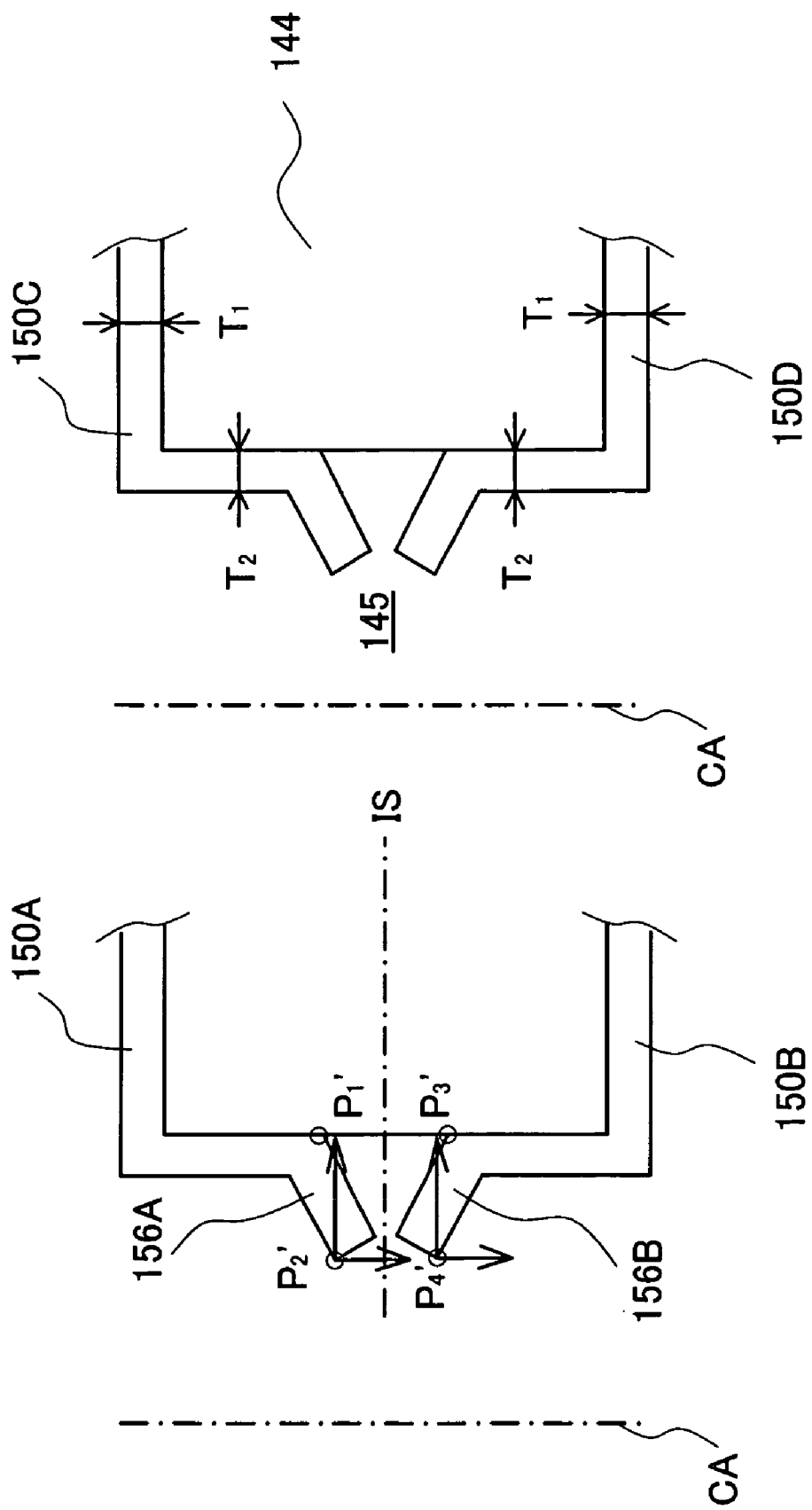

PRIOR ART

LIKELY TO DEFORM
→ CONTACT PRESSURE 220N

LIKELY TO DEFORM
→ CONTACT PRESSURE 266N

HEAD STACK ASSEMBLY, ITS MANUFACTURING METHOD, AND MAGNETIC DISC DRIVE HAVING THE SAME

This application claims the right of a foreign priority based on Japanese Patent Applications Nos. 2005-100198, 2005-100199, 2005-100200 and 2005-100201, each filed on Mar. 30, 2005, each of which is hereby incorporated by reference herein in its entirety as if fully set forth herein.

BACKGROUND OF THE INVENTION

The present invention relates generally to a head stack assembly ("HSA") that supports and drives a head and a magnetic disc drive having the HSA, and more particularly to a connection between a suspension and an arm in the HSA. The present invention is suitable, for example, for a manufacture of the HSA used for a hard disc drive ("HDD").

Along with the recent spread of the Internet etc., demand for recording a large amount of information including motion and still pictures have increased. Therefore, a large-capacity magnetic disc drive, such as HDD, has increasingly required. The HDD typically includes a disc on which a magnetic material is adhered, and a HSA that supports a head and moves the head to a target position on the disc. The HSA includes a carriage (also referred to as an "actuator", an "E-block" due to its E-shaped section or "actuator ("AC") block"), a suspension attached to a support portion of the carriage (referred to as an "arm" hereinafter), a magnetic head part supported on the suspension, and a base plate that attaches the suspension to the arm. The magnetic head part includes a fine head core (simply referred to as a "head" hereinafter) that records and reproduces a signal, and a slider that supports the head.

The suspension also serves as a flat spring that compresses the slider against the disc at a predetermined compression force. As the disc rotates, the airflow or air bearing occurs between the slider and the disc, and floats the slider from the disc surface. The floating slider is spaced from the disc by a predetermined distance due to a balance between the floating force and the compression force. In this state, the arm rotates and moves the head to (seek for) a target position on the disc, for information reading and writing.

A recent high-density disc requires high head positioning precision, and thus the HSA should be manufactured precisely. For example, when the suspension warps or twists due to the manufacturing errors, the compression force, the flying height, the orientation and vibration tolerance may vary from the designated values, and the positioning accuracy deteriorates.

In the HSA, the suspension and base plate are laser-welded to each other, whereas the base plate is swaged or caulked with the arm. The swaging is the way of jointing the base plate with the arm by crushes or plastically deforms part of the base plate against the arm. The swaged base plate and arm are separable when a sharp member is inserted between them, and improves the economical efficiency of the magnetic disc drive, because when the suspension and the magnetic head part are defective, it is sufficient to replace only the base plate side instead of the entire HSA.

However, the force for the plastic deformation to the base plate causes a deformation of the base plate, such as warp, and deteriorates the head positioning accuracy. One proposed method that reduces the deformation of the base plate is to form a thin-walled section between the part of the base plate that receives a deformative force and a joint of the suspension and to reduce the influence of the deformation of the base plate on the suspension. See, for example, Japanese Patent Application, Publication No. 7-192420.

The instant inventors have discovered that the deformation of the base plate results from a superposition between base plate's own deformation due to a plastic deformation force, and arm's deformation. Japanese Patent Application, Publication No. 7-192420 that attempts to prevent only the former cannot sufficiently reduce the influence of the arm's deformation on the base plate. In addition, Japanese Patent Application, Publication No. 7-192420 arranges the thin-walled section on the arm, and poses a problem that the lower base plate warps downwardly. This is because the thin-walled section reduces the rigidity of the base plate at the suspension side and the base plate is likely to deform due to the gravity and vibrations during swaging. Since the arm supports part of the base pate at the suspension side from the thin-walled section, the problem associated with the upper base plate can be solved to some extent. On the other hand, there is no support member under the lower base plate, and the deformation becomes conspicuous.

BRIEF SUMMARY OF THE INVENTION

Accordingly, it is one object of the present invention to provide a HSA, its manufacturing method, and a magnetic disc having the HSA, which effectively restrain the deformation of the arm, and/or which effectively restrain the deformation of the base plate itself due to swag.

A method according to one aspect of the present invention for manufacturing a HSA that includes a pair of suspensions each of which supports a head, an arm that drives the head, and a pair of base plates that attach the pair of suspensions to both sides of the arm that has a perforation hole, each of the pair of base plates having a boss with an opening includes the step of swaging the pair of base plates with the arm by passing, in one direction, a processing member larger than the opening through the perforation hole and the base plates while the pair of base plates are being inserted into the perforation hole at both sides of the perforation hole, wherein where a neutral plane is defined as a plane that halves a thickness of the arm and is perpendicular to a section that includes a center axis of the perforation hole, a first position is defined as a position that has a minimum internal diameter of the base plate, and a second position is defined as a position closest to the neutral plane among contact positions between the base plates and the arm, a distance between the neutral plane and the first position is equal to or smaller than a distance between the neutral plane and the second position before the swaging step. According to this method, when the processing member, such as a swaging ball, is passed in one direction, the power point of the base plate which receives the force from the processing member is closer to the neutral plane than a fulcrum that is a contact point between the base plate and the arm. Therefore, a pair of base plates are likely to deform towards the neutral plane, and the forces applied to the arm become closer with respect to the neutral plane than those in the conventional structure. As a result, the deformation of the arm reduces. Preferably, the base plate among the pair of base plates, which is located downstream along the one direction, deforms in an upstream direction along the one direction or in a direction approaching to the neutral plane during the swaging step. The first position is defined as an intermediate position between the farthest position from the neutral plane and the closest position to the neutral plane among positions that have the minimum internal diameter where the positions have the minimum internal diameter of the base plate form a surface.

Where θ is an angle between a line that passes the second position on the section and is parallel to the neutral plane (where a direction going away from the neutral plane is positive), and a line that connects the first and second positions to each other, θ preferably satisfies −17°≦θ≦0°, because the warp amount of the arm relative to the angle is approximately constant in this range where the position having the minimum internal diameter on the base plate is regarded as a point in the section. More preferably, θ satisfies −12°≦θ≦0°, because the warp amounts of both base plates relative to the angle are approximately constant in this range.

A pair of base plates may have the same shape before the swaging step. Thereby, it is unnecessary to prepare two types of base plates, and the operability improves.

A HSA according to another aspect of the present invention includes a pair of suspensions each of which supports a head, an arm that drives the head and has a perforation hole, and a pair of base plates, swaged with both sides of the perforation hole of the arm, which attach the pair of suspensions to both sides of the arm, wherein a larger distance between the closest points of the pair of base plates to a neutral plane that halves a thickness of the arm, and the closest position to the neutral plane among contact positions between the base plates and the arm is 130% or smaller, more preferably 115% or smaller, of a smaller distance. Since two base plates are similarly apart from the neutral plane, the moment applied to the arm can be reduced.

A method according to another aspect of the present invention for manufacturing a HSA that includes a suspension that supports a head, an arm that drives the head, and a base plate that has a boss with an opening and attaches the suspension to the arm that has a perforation hole, the base plate includes the step of swaging the pair of base plates with the arm by passing, in one direction, a processing member larger than the opening through the perforation hole and the base plate while the base plate is being inserted into the perforation hole, wherein the smallest thickness of the boss perpendicular to the one direction within the perforation hole is 60% or smaller of a thickness of the base plate outside the perforation hole in a section that includes a center axis of the perforation hole before the swaging step. Preferably, the smallest thickness of the boss perpendicular to the one direction within the perforation hole is 35% or greater of the thickness of the base plate outside the perforation hole, or 40% or greater when the manufacturing errors are considered. The smallest thickness of the boss in the perforation hole is preferably about 50% of the thickness of the base plate outside the perforation hole or greater. When it is greater than 60%, the warp amount of the base plate increases, and when it is smaller than 35%, the displacements of both the base plates drastically increase.

Where a neutral plane is defined as a plane that halves a thickness of the arm and is perpendicular to the section, a first position is defined as a position that has a minimum internal diameter of the base plate and is farthest from the neutral position, and a second position is defined as a position that is closest to the neutral plane among contact positions between the base plate and the arm, a distance between the neutral plane and the first position is smaller than a distance between the neutral plane and the second position before the swaging step. According to this method, when the processing member, such as a swaging ball, is passed in one direction, the power point of the base plate which receives the force from the processing member is closer to the neutral plane than a fulcrum that is a contact point between the base plate and the arm. Therefore, a pair of base plates are likely to deform towards the neutral plane, and the forces applied to the arm become closer with respect to the neutral plane than those in the conventional structure. As a result, the deformation of the arm reduces. Preferably, the base plate among the pair of base plates, which is located downstream along the one direction, deforms in an upstream direction along the one direction or in a direction approaching to the neutral plane during the swaging step.

A HSA according to another aspect of the present invention includes a suspension that supports a head, an arm that drives the head and has a perforation hole, and a base plate, swaged onto the perforation hole of the arm, which attaches the suspension to the arm, wherein in a section that includes a center axis of the perforation hole, the smallest thickness of the boss perpendicular to the center axis within the perforation hole is 60% of a thickness of the base plate outside the perforation hole or smaller. Preferably, the smallest thickness of the boss perpendicular to the center axis within the perforation hole is 35% or greater of the thickness of the base plate outside the perforation hole. The smallest thickness of the boss perpendicular to the center axis within the perforation hole is about 50% or greater of the thickness of the base plate outside the perforation hole. Even after swaging, the minimum thickness of the boss within the perforation hole does not greatly change. Therefore, the HSA that satisfies the condition similar to those of the above manufacturing method exhibits similar operations as those of the manufacturing method.

A method according to another aspect of the present invention for manufacturing a HSA that includes a pair of suspensions each of which supports a head, an arm that drives the head, and a pair of base plates that attach the pair of suspensions to both sides of the arm that has a perforation hole, each of the pair of base plates having a boss with an opening includes the step of swaging the pair of base plates with the arm by passing, in one direction, a processing member larger than the opening through the perforation hole and the base plates while the pair of base plates are being inserted into the perforation hole at both sides of the perforation hole, wherein where a neutral plane is defined as a plane that halves a thickness of the arm, a moment around the neutral plane applied from the pair of base plates to the arm after the swaging step is smaller than a moment around the neutral plane applied to the arm from a structure that has arranged an upstream base plate among the pair of base plates along the one direction symmetrically with respect to the neutral plane instead of a downstream base plate and has been swaged by the processing member. Since the moments applied by a pair of bosses cancel each other, the arm's deformation reduces.

In order to reduce the moment, the contact pressure and/or a distance between the contact-pressure applying position and the neutral plane may be controlled. For example, the smallest internal diameter of the upstream base plate among the pair of base plates may be smaller than the smallest internal diameter of the downstream base plate before the swaging step. Alternatively, before the swaging step, in a section that includes a center axis of the perforation hole, where a first position is defined as a position on the base plate which first contacts the processing member, and a second position is defined as one of contact positions between the base plate and the arm, the second position may be closer to the neutral plane than the first position on the upstream base plate and the first position is closer to the neutral plane than the second position on the downstream base plate. Moreover, before the swaging step, a distance between the neutral plane and a contact point between the arm and the upstream base plate among the pair of base plates may be longer than a distance between the neutral plane and a contact point between the downstream base plate and the arm.

In a section that includes a center axis of the perforation hole before the swaging step, a minimum thickness of the boss perpendicular to the center axis within the perforation hole may be 60% of a thickness of the base plate outside the perforation hole or smaller. This configuration can reduce the base plate's own deformation due to swaging.

A method according to another aspect of the present invention for manufacturing a head stack assembly that includes a suspension that supports a head, an arm that drives the head, and a base plate that has a boss with an opening and attaches the suspension to the arm that has a perforation hole includes the step of swaging the base plate with the arm by passing, in one direction, a processing member larger than the opening through the perforation hole and the base plate while the base plate is being inserted into the perforation hole, wherein where a neutral plane is defined as a plane that halves a thickness of the arm, a swaging position is located within a range of ±10% of a thickness of the arm from the neutral plane, the swaging position being defined as an intermediate position between a first position that is the most upstream position and a second position that is the most downstream position among contact positions between the base plate and the arm along the one direction. When the swaging position is located in this range, the moment applied to the arm around the neutral plane from the base plate reduces, and the arm's deformation reduces. When the manufacturing errors of the base plate are considered, the swaging position is preferably located within a range of ±5% of the thickness of the arm from the neutral plane.

A HSA according to another aspect of the present invention includes a suspension that supports a head, an arm that drives the head and has a perforation hole, and a base plate that attaches the suspension to the arm and has a boss swaged with the perforation hole of the arm, the boss being arranged across a neutral plane where a neutral plane is defined as a plane that halves a thickness of the arm. When the swaging position is located in this range, the moment applied to the arm around the neutral plane from the base plate reduces, and the arm's deformation reduces. Where a swaging position is located within a range of ±10%, preferably ±5%, of the thickness of the arm from the neutral plane, the swaging position being an intermediate position between a first position that is the most upstream position and a second position that is the most downstream position among contact positions between the base plate and the arm along a moving direction of a swaging processing member. Thereby, the HSA exhibits the operation similar to that of the above manufacturing method.

A magnetic disc drive that includes the above HSA or the HSA manufactured by the above method maintains the high positioning accuracy and constitutes one aspect of the present invention.

Other objects and further features of the present invention will become readily apparent from the following description of the preferred embodiments with reference to accompanying drawings.

BRIEF DESCRIPTION OF THE DRAWINGS

FIGS. 4A and 4B are schematic plane and sectional views of a suspension jointed with a base plate.

FIGS. 5A and 5B are schematic plane and sectional views of the base plate shown in FIGS. 4A and 4B.

FIGS. 9A to 9C are schematic sectional views of a conventional structure that swags the base plates with both sides of the arm.

FIGS. 10A and 10B are schematic sectional views of shapes of the base plates shown in FIG. 8.

DETAILED DESCRIPTION OF THE PREFERRED EMBODIMENTS

Figure 1:
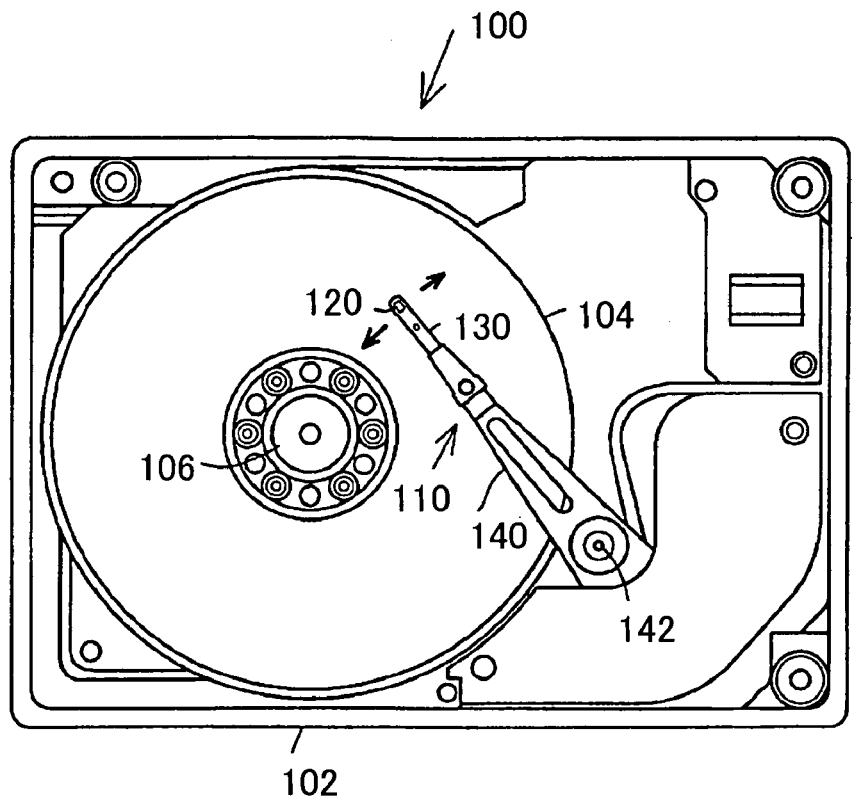
FIG. 1 is an internal structure of a hard disc drive ("HDD") according to one embodiment of the present invention.

Referring now to the accompanying drawings, a description will be given of a HDD 100 according to one embodiment of the present invention. The HDD 100 includes, as shown in FIG. 1, plural magnetic discs 104 each serving as a recording medium, a spindle motor 106, and a HSA 110 in a housing 102. Here, FIG. 1 is a schematic plane view of the internal structure of the HDD 100.

The housing is made, for example, of aluminum die cast base and stainless steel, and has a rectangular parallelepiped shape to which a cover (not shown) that seals the internal space is jointed. The magnetic disc 104 of this embodiment has a high surface recording density, such as 100 Gb/in$^2$ or greater. The magnetic disc 104 is mounted on a spindle of the spindle motor 106 through its center hole of the magnetic disc 104.

The spindle motor 106 rotates the magnetic disc 104 at such a high speed as 15,000 rpm, and has, for example, a brushless DC motor (not shown) and a spindle as its rotor part. For instance, two magnetic discs 104 are used in order of the disc, a spacer, the disc and a clamp stacked on the spindle, and fixed by bolts coupled with the spindle. Unlike this embodiment, the magnetic disc 104 may be a disc that has no center hole but a hub, and the spindle rotates the disc via the hub.

The HSA 100 includes a magnetic head part 120, a suspension 130, a carriage 140, and a base plate 150.

Figure 2:
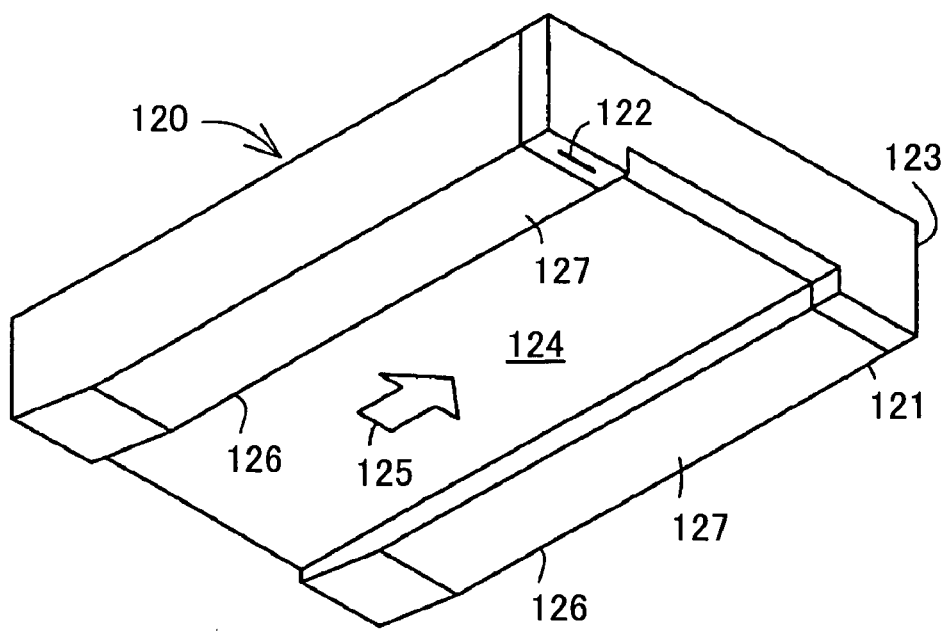
FIG. 2 is an enlarged perspective view of a magnetic head part in the HDD shown in FIG. 1.

The magnetic head 120 includes, as shown in FIG. 2, an approximately square, Al$_2$O$_3$—TiC (Altic) slider 121, and a head device built-in film 123 that is jointed with an air outflow end of the slider 121 and has a reading and recording head 122. Here, FIG. 2 is an enlarged view of the magnetic head part 120. The slider 121 and the head device built-in film 123 define a medium opposing surface to the magnetic disc 104, i.e., a floating surface 124. The floating surface 124 receives airflow 125 that occurs with rotations of the magnetic disc 104.

A pair of rails 126 extend on the floating surface 124 from the air inflow end to the air outflow end. A top surface of each rail 126 defines a so-called air-bearing surface ("ABS") 127. The ABS 127 generates the buoyancy due to actions of the airflow 125. The head 122 embedded into the head device built-in film 123 exposes from the ABS 127. The floating system of the magnetic head part 120 is not limited to this mode, and may use known dynamic and static pressure lubricating systems, piezoelectric control system, and other floating systems. The activation system may be a contact start stop ("CSS") system in which the magnetic head part 120 contacts the disc 104 at the stop time, or a dynamic or ramp loading system in which the magnetic head part 120 is lifted up from the disc 104 at the stop time and held on the ramp outside the disc 104 while the magnetic head part 120 does not contact the disc 104, and the magnetic head part 120 is dropped from the holding part to the disc 104 at the start time.

The head 122 is a MR inductive composite head that includes an inductive head device that writes binary information in the magnetic disc 104 utilizing the magnetic field generated by a conductive coil pattern (not shown), and a magnetoresistive ("MR") head that reads the binary information based on the resistance that varies in accordance with the magnetic field applied by the magnetic disc 104. A type of the MR head device is not limited, and may use a giant magnetoresistive ("GMR"), a CIP-GMR ("GMR") that utilizes a current in plane ("CIP"), a CPP-GMR that utilizes a perpendicular to plane ("CPP"), a tunneling magnetoresistive ("TMR"), an anisotropic magnetoresistive ("AMR"), etc.

The suspension 130 serves to support the magnetic head part 120 and to apply an elastic force to the magnetic head part 120 against the magnetic disc 104, and is, for example, a Watlas type suspension made of stainless steel. This type of suspension has a flexure (also referred to as a gimbal spring or another name) which cantilevers the magnetic head part 120, and a load beam (also referred to as a load arm or another name) which is connected to the base plate. The load beam has a spring part at its center so as to apply a sufficient compression force in a Z direction. Therefore, the load beam includes a rigid part at its proximal end, a spring part at its center, and a rigid part at its distal end. The load beam contacts the flexure via a projection called a dimple (referred to as a pivot or another name) so that the ABS 124 follows the disc's warp and swell and it is always parallel to the disc surface. The magnetic head part 120 is designed to softly pitch and roll around the dimple. The suspension 130 also supports a wiring part 138 that is connected to the magnetic head part 120 via a lead etc. The wiring part 138 is shown in FIG. 4A, which will be described later. Via this lead, the sense current flows and read/write information is transmitted between the head 122 and the wiring part 138. The wiring part 138 is connected to a relay flexible circuit board ("FPC") 143 under the arm 144 shown in FIG. 3B.

As described later, this embodiment reduces the warp amount of the base plate 150 and thus improves the flatnesses of the suspension 130 and the magnetic head part 120, thereby preventing crushes and maintaining positioning accuracy due to excessive elastic force and torsion force.

Figure 3A:
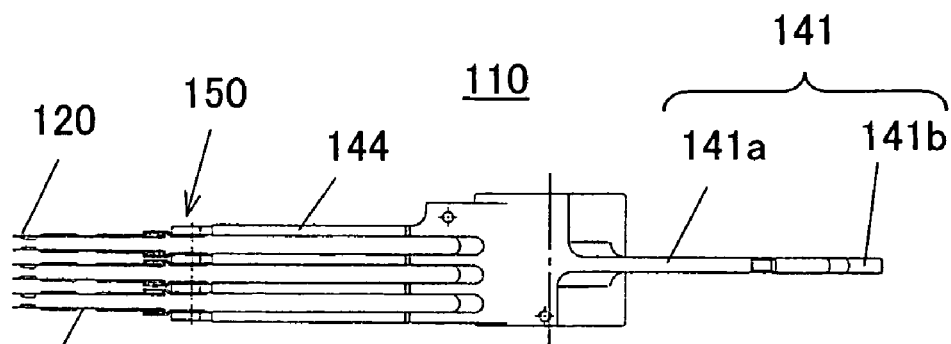
FIGS. 3A to 3C are left side, plane and right side views, respectively, showing a detailed structure of a head stack assembly ("HSA") shown in FIG. 1.
Figure 3B:
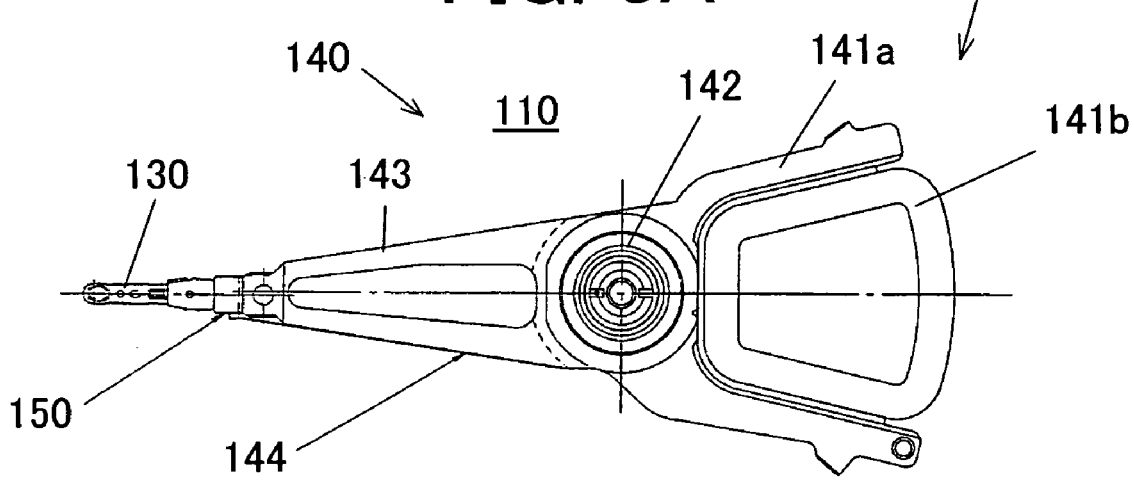
Figure 3C:
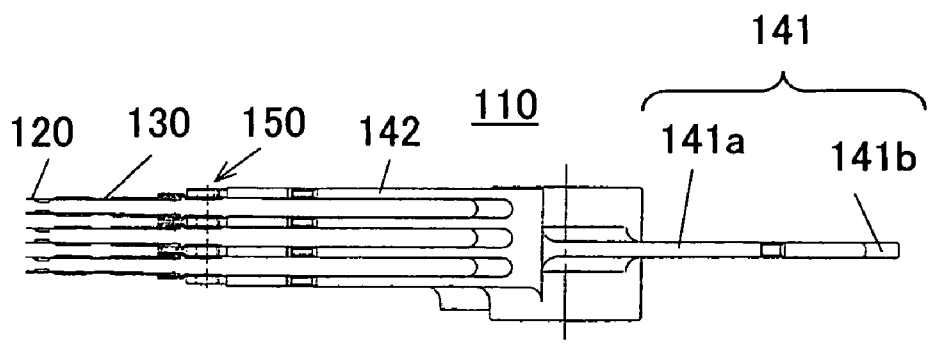

The carriage 140 serves to rotate the magnetic head part 120 in arrow directions shown in FIG. 1 and includes, as shown in FIGS. 1 and 3A to 3C, a voice coil motor 141, a support shaft 142, a FPC 143, and an arm 144. Here, FIG. 3A is a left side view of the HSA 110. FIG. 3B is a plane view of the HSA 110. FIG. 3C is a right side view of the HSA 110. While FIGS. 3A to 3C show the carriage 140 that drives six magnetic head parts 120 that record and reproduce both sides of three discs 104, the number of discs is, of course, not limited to three.

The voice coil motor 141 has a flat coil 141b between a pair of yokes 141a. The flat coil 141b opposes to a magnetic circuit (not shown) provided to the housing 102 of the HDD 100, and the carriage 140 swings around the support shaft 142 in accordance with values of the current that flows through the flat coil 141b. The magnetic circuit includes, for example, a permanent magnet fixed onto an iron plate fixed in the housing 102, and a movable magnet fixed onto the carriage 140. The support shaft 142 is inserted into a hollow cylinder in the carriage 140, and extends perpendicular to the paper surface of FIG. 1 in the housing 102. The FPC 143 provides the wiring part 138 with a control signal, a signal to be recorded in the disc 104, and the power, and receives a signal reproduced from the disc 104.

The arm 144 is an aluminum rigid body that can rotate or swing around the support axis 142, and has a perforation hole 145 at its top, which will be described later. The suspension 130 is attached to the arm 144 via the perforation hole 145 in the arm 144 and the base plate 150. The arm 144 has a comb shape when viewed from a side as shown in FIGS. 3A and 3C.

The base plate 150 serves to attach the suspension 130 to the arm 144, and includes, as shown in FIGS. 4A to 5B, a plate section 151, a welded section 152, and a dent or dowel 154. The welded portion 152 is a tip of the plate section 151 to be laser-welded with the suspension 130. The dent 154 is a part to be swaged with the arm 144. Here, FIG. 4A is a schematic plane view of the suspension 130 jointed with the base plate 150. FIG. 4B is a schematic sectional view of that suspension 130. FIG. 5A is a schematic plane view of the base plate 150. FIG. 5B is a schematic sectional view of the base plate 150.

Figure 6:
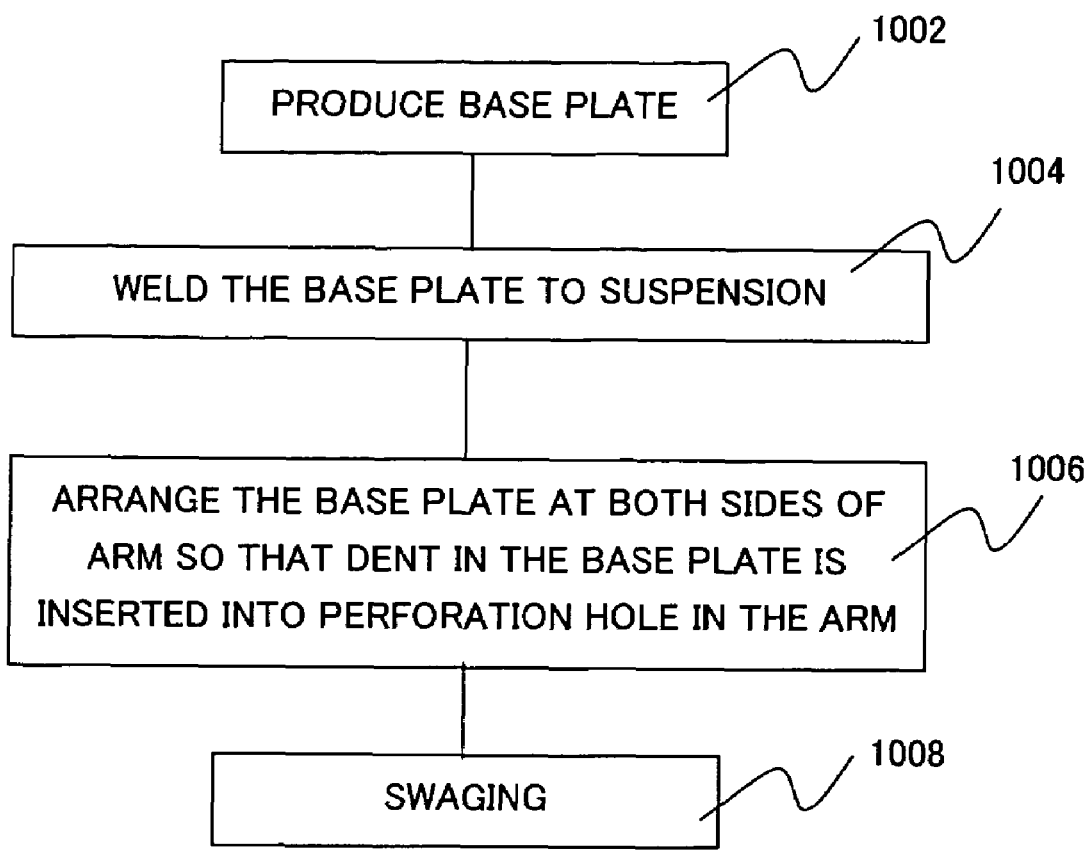
FIG. 6 is a flowchart for explaining a manufacturing method of a structure shown in FIGS. 3A and 3C in which a pair of base plates are swaged with both sides of the arm.

Referring now to FIG. 6, a description will be given of connections between a second arm 144 from the top in FIG. 3A and a pair of base plates 150. The second arm 144 from the top in FIG. 3A has a double-head structure, in which the base plates 150 are attached to both sides of the arm 144. Here, FIG. 6 is a flowchart for explaining connections between the arm 144 and the base plates 150.

Figure 7:
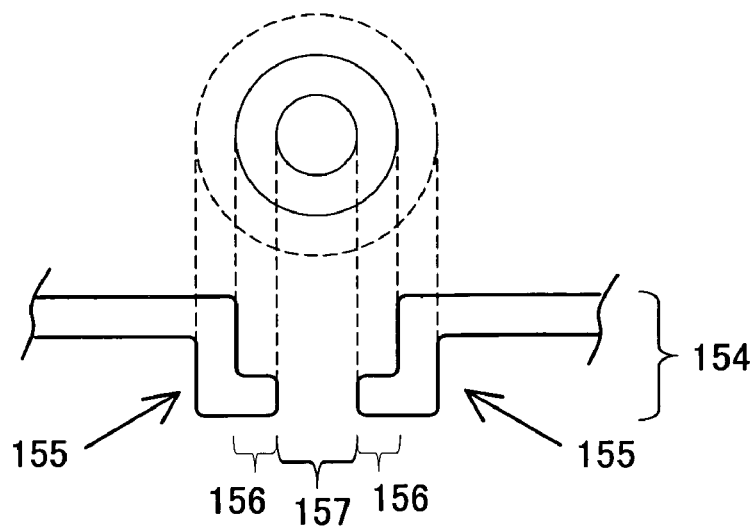
FIG. 7 shows schematic plane and sectional views of a dent in the base plate shown in FIGS. 5A and 5B.

First, as shown in FIGS. 5A and 5B, the base plate 150 is produced (step 1002). Step 1002 forms the dent 154 in the plate section 151 of the base plate 150 by press work. The dent 154 has an extended section or rim 156 and an opening 157, as shown in FIG. 7 at its top. The extended section 156 and its vicinity form the L-shaped boss 155 that plastically deforms. Here, FIG. 7 is a schematic enlarged plane and sectional views of the base plate 150.

Next, as shown in FIGS. 4A and 4B, the welded section 152 of the base plate 150 is laser-welded with the suspension 130 (step 1004). The magnetic head part 120 is attached to the suspension 130 before or after step 1004.

Figure 8:
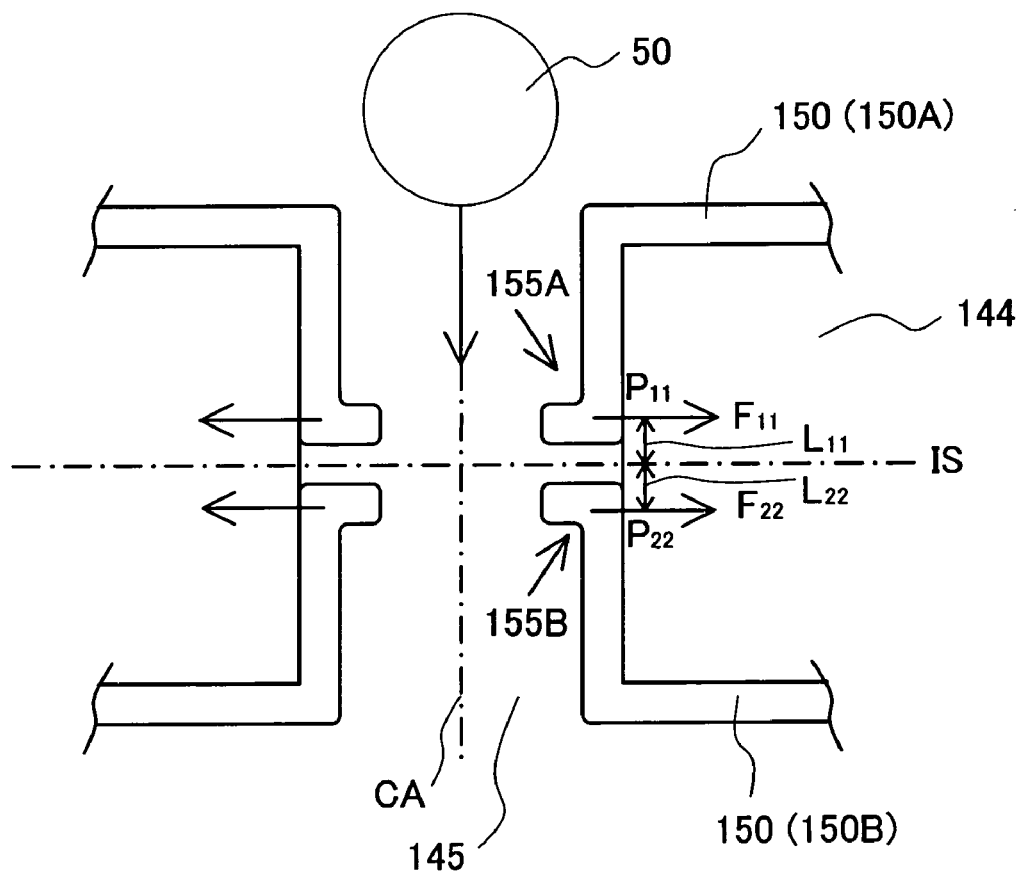
FIG. 8 is a schematic sectional view for explaining swaging of the base plates shown in FIGS. 5A and 5B with both sides of the arm.

Next, as shown in FIG. 8, the base plate 150 is arranged at both sides of the arm 144 so that the dent 152 of each base plate 150 is inserted into the perforation hole 145 of the arm 144 (step 1006). Here, FIG. 8 shows a pair of base plates 150 engaged with both sides of the arm 144. Next, swaging follows (step 1008). The swaging passes a swaging ball 50 whose diameter is slightly greater than a diameter of the opening 157, in one direction shown by an arrow through the perforation hole 145. As a result, the boss 155 of the base plate 150 crushes and plastically deforms as shown by horizontal arrows in FIG. 8, thereby jointing the base plates 150 with the arm 144. As shown by an alternate long and short dash line in FIG. 8, a surface that halves the thickness of the arm 144, and is perpendicular to the center axis CA of the perforation hole 145 is referred to as a neutral plane IS.

The instant inventors have discovered that the conventional upper and lower base plates when arranged as shown in FIG. 8 warp upwardly because the base plate's deformation is influenced not only by the base plate's own deformation due to the plastic deformation force by the ball 50 but also by the arm 144's deformation.

FIG. 9A exaggerates shapes of the conventional base plates 30A and 30B. More specifically, FIG. 9A is a partially enlarged sectional view of an arrangement between conventional base plates 30A and 30B and the arm 144 before swaging. A position or power point $P_2$ at which the ball 50 first contacts the upper base plate 30A is located above a position or fulcrum $P_1$ at which the base plate 30A contacts the arm 144, i.e., the fulcrum $P_1$ is located closer to the neutral plane IS than the power point $P_2$. This is because when the power point $P_2$ is closer to the neutral plane IS than the fulcrum $P_1$, an upper extended section 32A is likely to deform in the counterclockwise arrow direction rather than against the arm 144 as the ball 50 passes. When the deformation force applied by the ball 50 is consumed for the downward deformation of an extended section 32A and the horizontal deformation reduces, the jointing force or contact pressure applied by a boss 31A to the arm 144 undesirably weakens, and the base plate 30A is likely to drop off from the arm 144. For similar reasons, a position or power point $P_4$ at which the ball 50 first contacts the lower base plate 30B is located under a position or fulcrum $P_3$ at which the base plate 30B contacts the arm 144, i.e., the fulcrum $P_3$ is located closer to the neutral plane IS than the power point $P_4$.

Next, the upper base plate 30A has a boss 31A with an L-shaped section, whereas the lower base plate 30B has a boss 31B with a reverse L-shaped section. As simply shown in FIG. 9B, when the L-shaped boss 31A and the reverse L-shaped boss 31B receive a perpendicularly downward force from the ball 50, both the bosses 31A and 31B deform both downwardly and horizontally. Here, FIG. 9B is a partial enlarged sectional view showing the forces applied to the conventional base plates due to swaging and the amounts of the contact pressures to the arm from the base plates.

In this case, a force $F_1$ that opens the L-shape is smaller than a force $F_2$ that closes the L-shape. While the ball 50 moves downwardly, the boss 31A needs a smaller force $F_1$ whereas the boss 31B needs a larger force $F_2$. This relationship is true of the contact pressure as a horizontal force: A contact pressure $F_3$ applied from the boss 31A to the arm 144 is smaller than a contact pressure $F_4$ applied from the boss 31B to the arm 144.

From the relationship between the contact pressures $F_3$ and $F_4$ around the neutral plane IS, the arm 144 receives the counterclockwise moment in FIG. 9B, and deforms upwardly in FIG. 9C. Here, FIG. 9C is a partial enlarged sectional view showing deformations of the base plates and the arm after swaging. The base plates 30A and 30B deform upwardly, following the arm 144. The upper arm 144 restricts the deformation of the base plate 30B, whereas there is no member that restricts the upper deformations of the base plate 30A, and the base plate 30A more greatly deforms upwardly. After swaging, the extended section of the base plate 30A is closer to the neutral plane IS than that of the base plate 30B. This results from the deformations of the base plates 30A and 30B caused by the arm 144's deformation, and the base plates 30A and 30B themselves deform at their extended sections 32A and 32B due to the forces $F_1$ and $F_2$. As a result, the deformations of the base plates 30A and 30B are a superposition between their own deformations and the arm 144's deformation.

In order to reduce the deformations of the base plates 30A and 30B due to the deformation of the arm 144, the instant inventors have first studied a reduction of a difference between the contact pressures $F_3$ and $F_4$ in FIG. 9B. When the difference between the contact pressures $F_3$ and $F_4$ becomes smaller, the moment applied to the arm 144 becomes smaller and the deformations become smaller.

In order to reduce the deformations of the base plates 30A and 30B due to the deformation of the arm 144, the instant inventors have next studied a structure in which the moments around the neutral plane IS applied from the upper and lower base plates 150A an 150B to the arm 144 cancel each other as completely as possible. In other words, in FIG. 8, this embodiment changes shapes and arrangements of the upper and lower base plates 150A and 150B before swaging so that a moment $M_1 = F_{11} \times L_{11}$ applied from the boss 155A of the base plate 150A to the arm 144 around the neutral plane IS is approximately equal to a moment $M_2 = F_{22} \times L_{22}$ applied from the boss 155B of the base plate 150B to the arm 144 around the neutral plane IS, where $F_{11}$ is a contact pressure applied from the boss 155A of the base plate 150A to the arm 144, $L_{11}$ is a distance between the point $P_{11}$ to which the contact pressure $F_{11}$ is applied and the neutral plane IS, $F_{22}$ is a contact pressure applied from the boss of the base plate 150B to the arm 144, and $L_{22}$ is a distance between the point $P_{22}$ to which the contact pressure $F_{22}$ is applied and the neutral plane IS. In order to make $M_1$ and $M_2$ approximately equal to each other where the base plate 150A is fixed, $F_{22}$ and/or $L_{22}$ of the base plate 150B need to be adjusted. In case where $L_{11} = L_{22}$, a difference between $F_{11}$ and $F_{22}$ may be reduced. Thereby, the moment applied to the arm 144 reduces, and its deformation reduces. For example, a reduction of a difference between the contact pressures $F_3$ and $F_4$ will be attempted in FIG. 9B.

The difference between the contact pressures $F_3$ and $F_4$ in FIG. 9B attributes to a fact that the extended section 32A of the upper base plate 30A deforms outwardly (or in the L-shape opening direction) while the extended section 32B of the lower base plate 30B deforms inwardly (or in the L-shape closing direction): In other words, the upper and lower extended sections 32A and 32B deform in different directions.

Accordingly, in principle, this embodiment inverts a positional relationship between the positions $P_1$ and $P_2$ and a positional relationship between the positions $P_3$ and $P_4$ in FIG. 9A to those shown in FIG. 10A. Here, FIG. 10A is a schematic view of the base plates 150A and 150B of this embodiment shown in FIG. 8 which arranges the power points $P_2'$ and $P_4'$ closer to the neutral plane IS than the fulcrums $P_1'$ and $P_3'$. Nevertheless, it is sufficient for the present invention to set a distance between the neutral plane IS and the power point $P_2'$ (or $P_4'$) smaller than a distance between the neutral plane IS and the power point $P_1'$ (or $P_3'$). In order to produce the base plate 150 having the structure shown in FIG. 10A, for example, an inclined surface is formed on a lower mold that forms a bottom surface of the extended section 156 of the base plate 150 in the mold of the pressing machine for use with step 1002.

With such an arrangement when the power points $P_2'$ and $P_4'$ receive horizontal forces from the ball 50, the extended section 156A of the upper base plate 150A and the extended section 156B of the lower base plate 150B deform in the same direction (or in the L-shape opening direction), and their resistances to the ball 50 become almost equal to each other. As a result, the difference between the contact pressure $F_{11}$ applied from the boss 155A of the upper base plate 150A to the arm 144 and the contact pressure $F_{22}$ applied from the boss 155B of the upper base plate 150B to the arm 144 reduces in FIG. 8. As a result, the deformation of the arm 144 reduces, and the warps of the base plates 150A and 150B and the suspensions 130 connected to them reduce.

As discussed above, when the power points $P_2'$ and $P_4'$ are arranged closer to the neutral plane IS than the fulcrums $P_1'$ and $P_3'$, the contact pressures applied from the bosses 155A and 155B to the arm 144 reduce. However, it is preferable for the precise positioning of the head 122 to maintain the flatness of the suspension 130 even when the contact pressure is slightly sacrificed. Nevertheless, if the contact pressure is excessively low, the suspension 130 is likely to disengage from the arm 144 and the vibration tolerance deteriorates. Therefore, this embodiment provides a predetermined lower limit, as described later.

In addition to the structure of FIG. 10A, the influence on the suspension 130 of the base plates' own deformations caused by the ball 50 can be limited by making, as shown in FIG. 10B, a minimum thickness $T_2$ within the perforation hole 145 smaller than an original thickness $T_1$ of the base plates 150C and 150D outside the perforation hole 145. Here, FIG. 10B is a schematic enlarged sectional view as a variation of FIG. 10A.

A pair of base plates 150A and 150B (or 150C and 150D) have the same shape in this embodiment. Therefore, it is unnecessary to prepare two types of base plates, and the operability improves. However, a pair of base plates 150A and 150B (or 150C and 150D) may have different shapes in another embodiment.

EXAMPLE 1

Figure 11A:
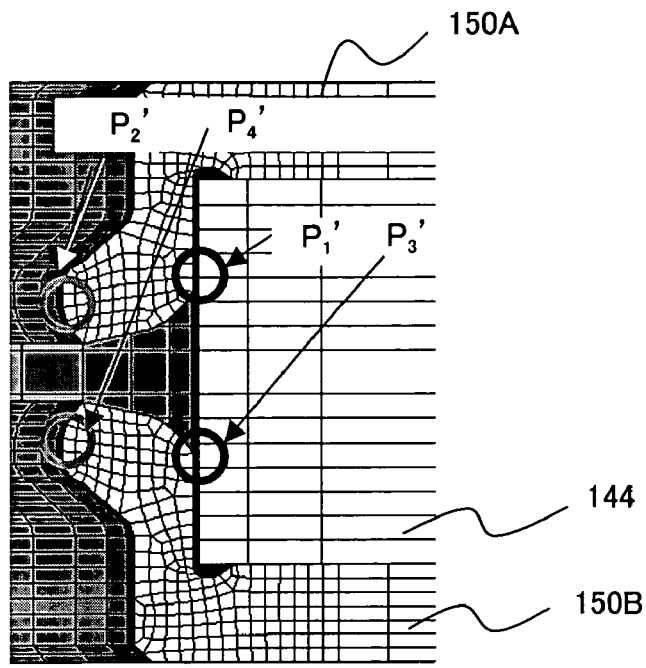
FIGS. 11A to 11C are schematic sectional views of base plates according to Example 1 of the present invention.
Figure 11B:
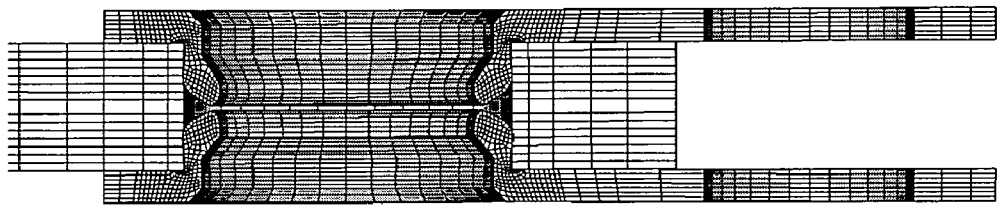

In FIG. 8, when $L_{11}$ is different from $L_{22}$, $L_{22}$ and/or $F_{22}$ may be adjusted so as to make $M_1$ and $M_2$ equal to each other, for example, by reducing $L_{22}$ so that $P_{22}$ approaches to the neutral plane IS or by enlarging the minimum diameter of the boss 155B and reducing $F_{22}$. In this embodiment, the base plates 150A and 150B having shapes shown in FIG. 11A before swaging are swaged and the shapes shown in FIG. 11B are obtained through simulation that utilizes a finite element method ("FEM"). In FIGS. 11A and 11B, $P_1'$ and $P_3'$ are approximately equally spaced from the neutral plane IS.

COMPARATIVE EXAMPLE

Figure 12A:
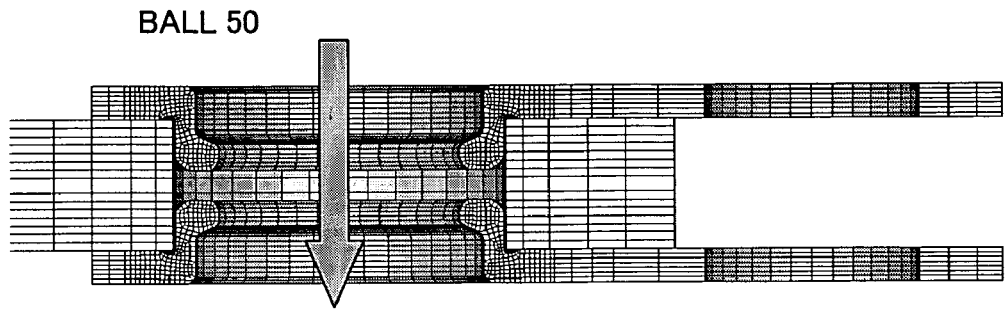
FIGS. 12A to 12C are schematic sectional views of a comparative example that includes the base plates swaged with both sides of the arm.
Figure 12B:
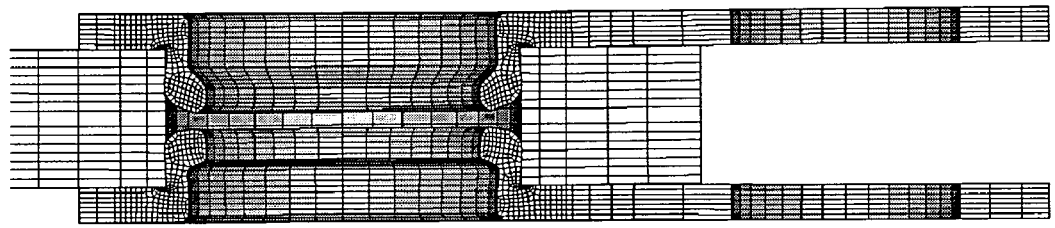

The conventional base plates 30A and 30B having shapes shown in FIG. 12A before swaging are swaged and the shapes shown in FIG. 12B are obtained through simulation that utilizes a FEM.

Figure 11C:
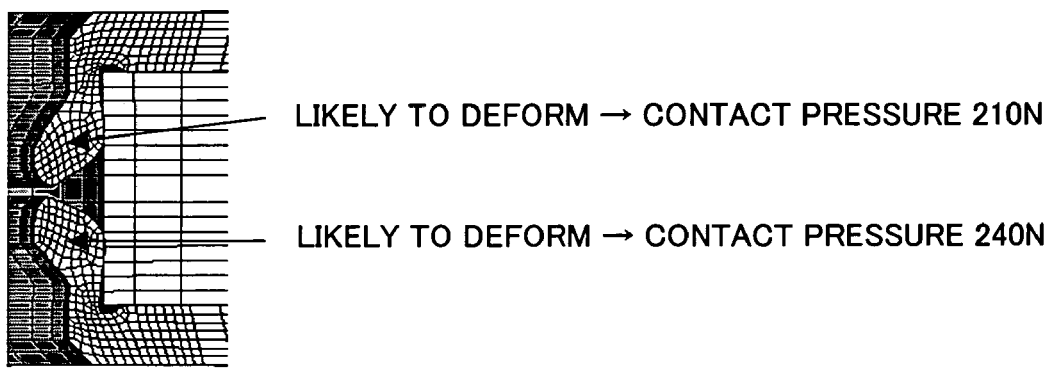
Figure 12C:
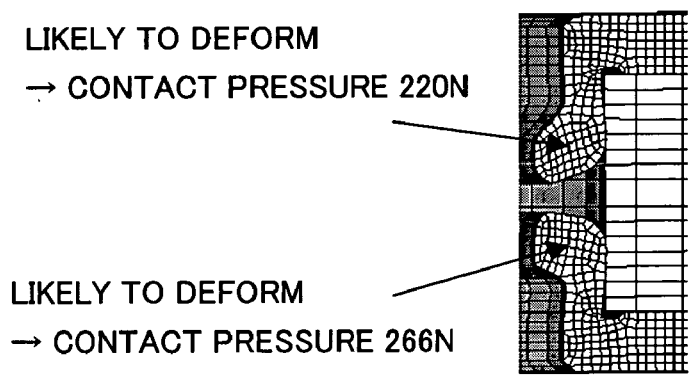

The contact pressures in FIGS. 11B and 12B are calculated: According to this embodiment, the upper contact pressure is 210 N and the lower contact pressure is 240 N as shown in FIG. 11C. According to the comparative example, the upper contact pressure is 220 N and the lower contact pressure is 266 N as shown in FIG. 12C. This embodiment is well-balanced between the upper and lower contact pressures, and has a warp amount reducing effect of about 40%.

In Example 1, after swaging shown in FIGS. 11B and 11C, distances from the base plates 150A and 150B and the neutral plane IS in a perpendicular direction or a longitudinal direction in FIG. 11C are approximately equal to each other. With respect to distances between the contact positions between the base plates 150A and 150B and the arm 144 and the closest points of the base plates 150A and 150B to the neutral plane IS, the larger distance is 130% of the smaller distance or smaller (corresponding to $-17° \leq \theta \leq 0°$ in Example 3 which will be described later), more preferably the larger distance is 115% of the smaller distance or smaller (corresponding to $-12° \leq \theta \leq 0°$ in Example 3 which will be described later). When distances between the two base plates 150A and 150B and the neutral plane IS are approximately equal to each other, the moment applied to the arm 144 reduces. On the other hand, in the comparative example shown in FIGS. 12B and 12C, with respect to distances from each base plate 30 to the neutral plane IS, the larger distance is three times as large as the smaller distance or greater.

An alternative example makes the upper base plate like a comparative example, and the lower base plate like this embodiment. As a result, the upper contact pressure is 220 N and the lower contact pressure becomes 240 N, and the contact pressure difference reduces further.

EXAMPLE 2

In the structure of Example 1, the thickness $T_2$ is made half the thickness $T_1$ as shown in FIG. 10B, and a relationship between the warp amounts of the base plates and the displacement of the arm is studied. Table 1 shows results of comparative example and Examples 1 and 2. In Table 1, a upper displacement is set plus, and UP in the "position" section means the upper base plate 150A or 150C, DN means the lower base plate 150B (or 150D).

TABLE 1

|  | POSITION | WARP AMOUNT [μm] | ARM'S DISPLACEMENT [μm] |
| --- | --- | --- | --- |
| COMPARATIVE EXAMPLE | UP | 12.20 | 3.98 |
|  | DN | −0.70 |  |
| EXAMPLE 1 | UP | 7.8 | 2.26 |
|  | DN | −3.1 |  |
| EXAMPLE 2 | UP | 6.10 | 2.32 |
|  | DN | −1.30 |  |

EXAMPLE 3

Figure 13:
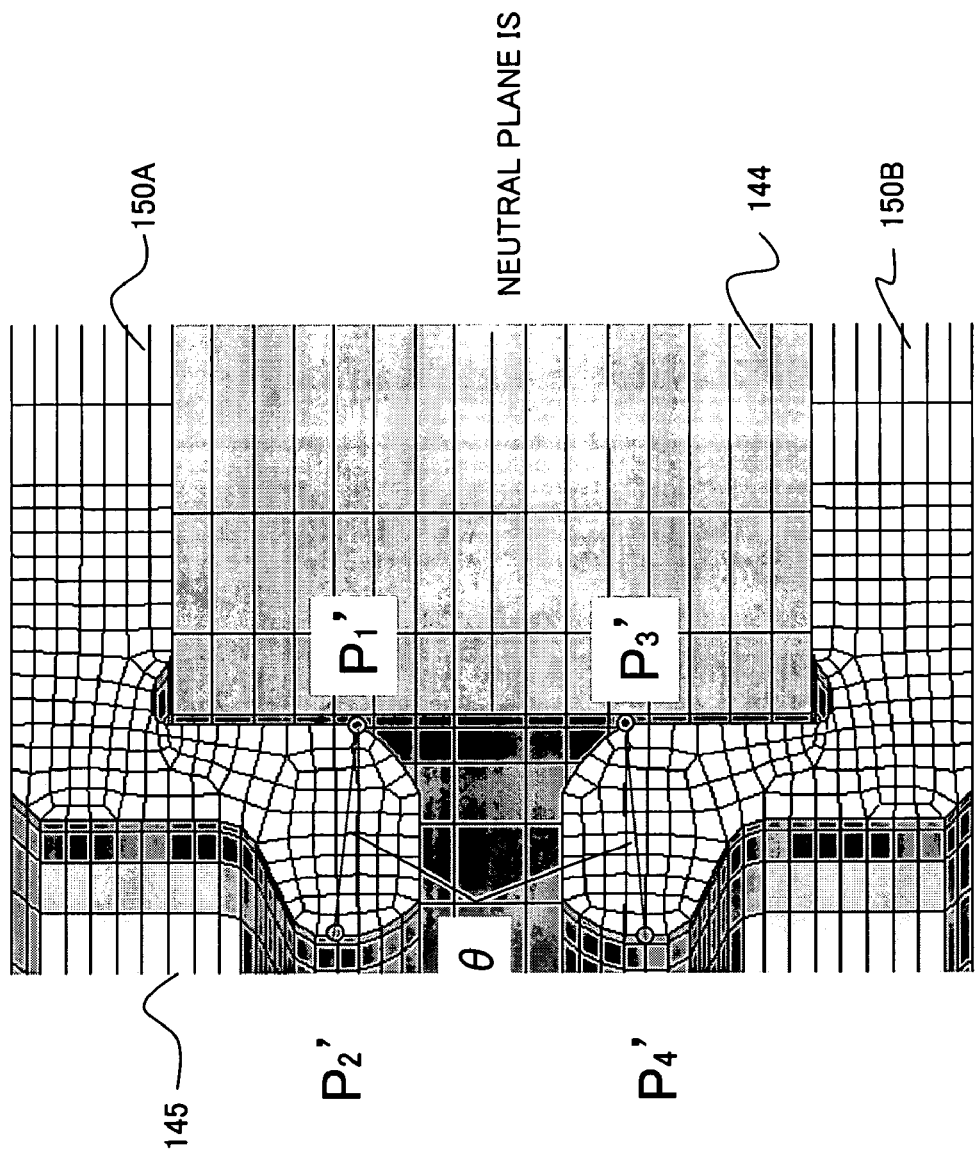
FIG. 13 is a schematic sectional view of base plates according to Example 3 of the present invention.

As shown in FIG. 13, a line is drawn from the fulcrum $P_1'$ parallel to the neutral plane IS and an angle $\theta$ is defined as an angle between this line and a line that connects the fulcrum $P_1'$ and the power point $P_2'$ to each other in the upper base plate 150A. Here, FIG. 13 is a section that includes the central axis (not shown) of the perforation hole 145 before swaging. The power points $P_2'$ and $P_4'$ are farthest from the neutral plane IS among positions having the smallest internal diameter on the base plates 150A and 150B. The fulcrums $P_1'$ and $P_3'$ are closest to the neutral plane IS among positions where the base plate 150A and 150B contact the arm 144.

Figure 14B:
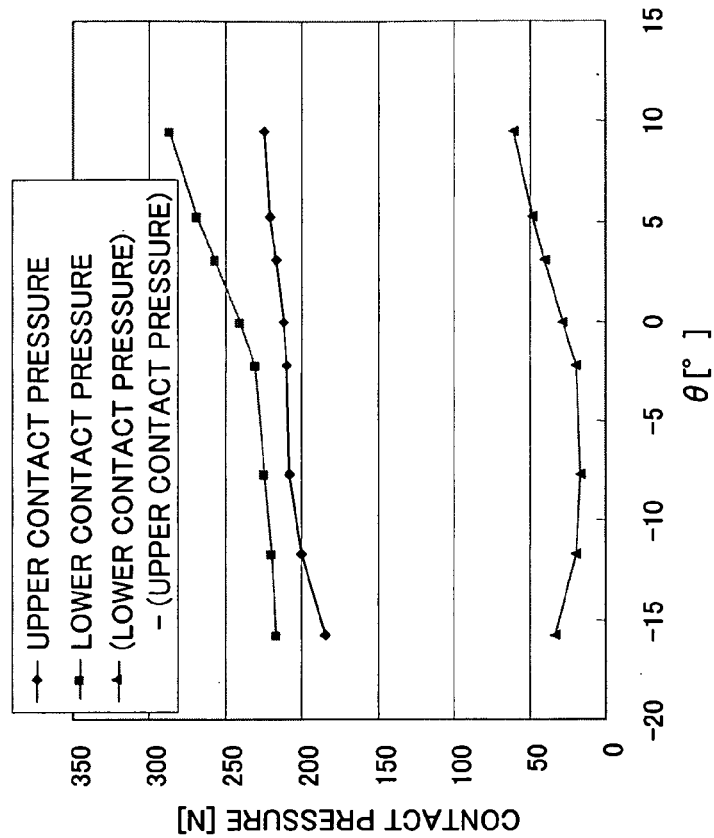
FIGS. 14A and 14B show graphs of results of Example 3.

Similarly, a line is drawn from the fulcrum $P_3'$ parallel to the neutral plane IS and an angle $\theta$ is defined as an angle between this line and a line that connects the fulcrum $P_3'$ and the power point $P_4'$ to each other in the lower base plate 150B. In FIG. 13, the power points $P_2'$ and $P_4'$ project when viewed from the ball 50, and each can be regarded as a point. The clockwise direction is positive for $\theta$ in the upper base plate 150A, and the counterclockwise direction is positive for $\theta$ in the lower base plate 150B. By changing $\theta$, the warp amounts of the base plates 150A and 150B and the arm 144, the upper and lower contact pressures, and a difference between these contact pressures are studied, and the results are summarized in FIGS. 14A and 14B.

Figure 14A:
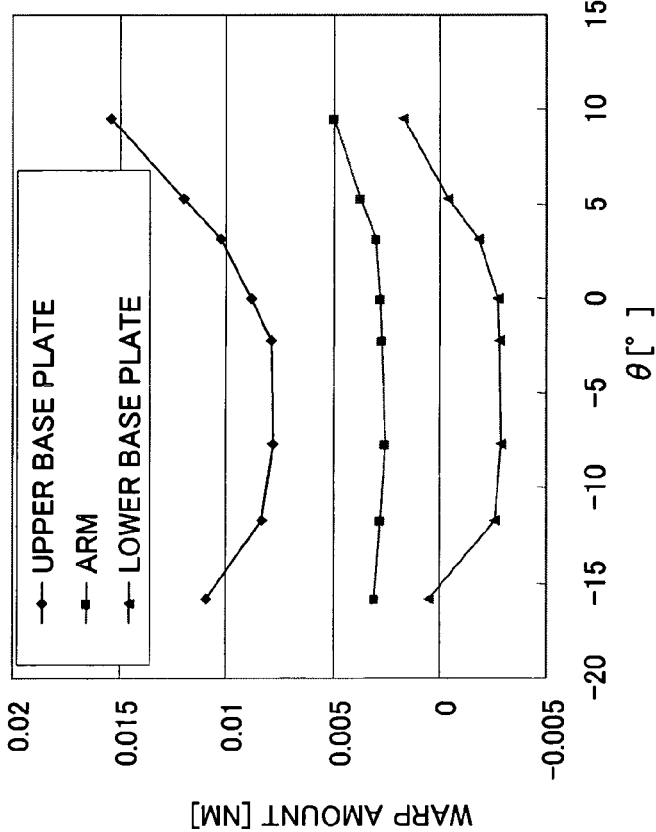

It is understood from FIG. 14A that the arm 144 has an approximately constant warp amount in a range $-17° \leq \theta \leq 5°$, but $-17° \leq \theta \leq 0°$ is preferable since $\theta$ is preferably equal to or smaller than 0. However, the warp amounts of the upper and lower base plates and a difference between the lower and upper contact pressures remarkably vary in the range of $\theta \leq -12°$, $-12° \leq \theta \leq 0°$ is more preferable.

In addition, when the stable contact pressure between the base plate 150 and the arm 144 is defined as 200 N, the upper contact pressure becomes 200 N or smaller in the range of $\theta \leq -12°$ and thus $-12° \leq \theta$ is preferable.

EXAMPLE 4

Figure 15:
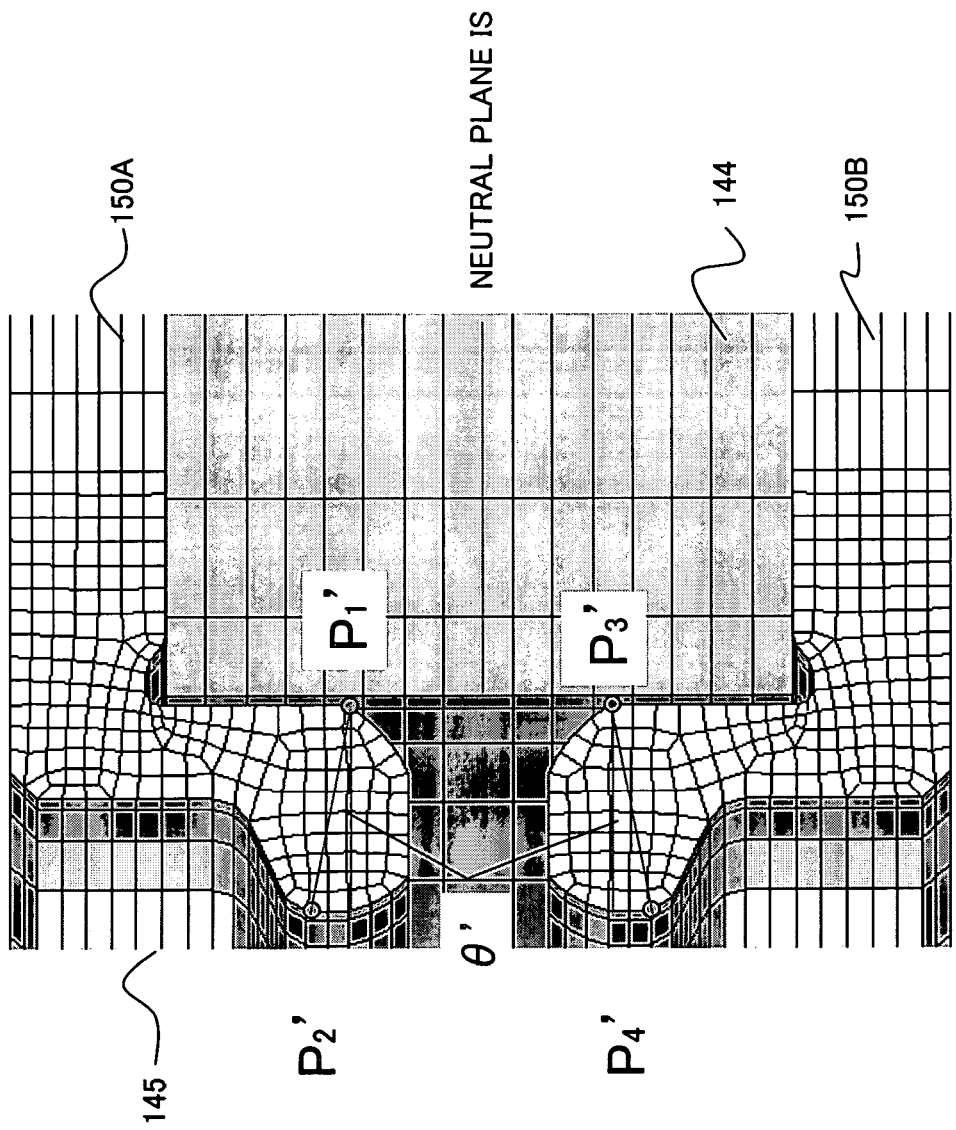
FIG. 15 is a schematic sectional view of a base plate according to Example 4 of the present invention.
Figures 16A, 16B:
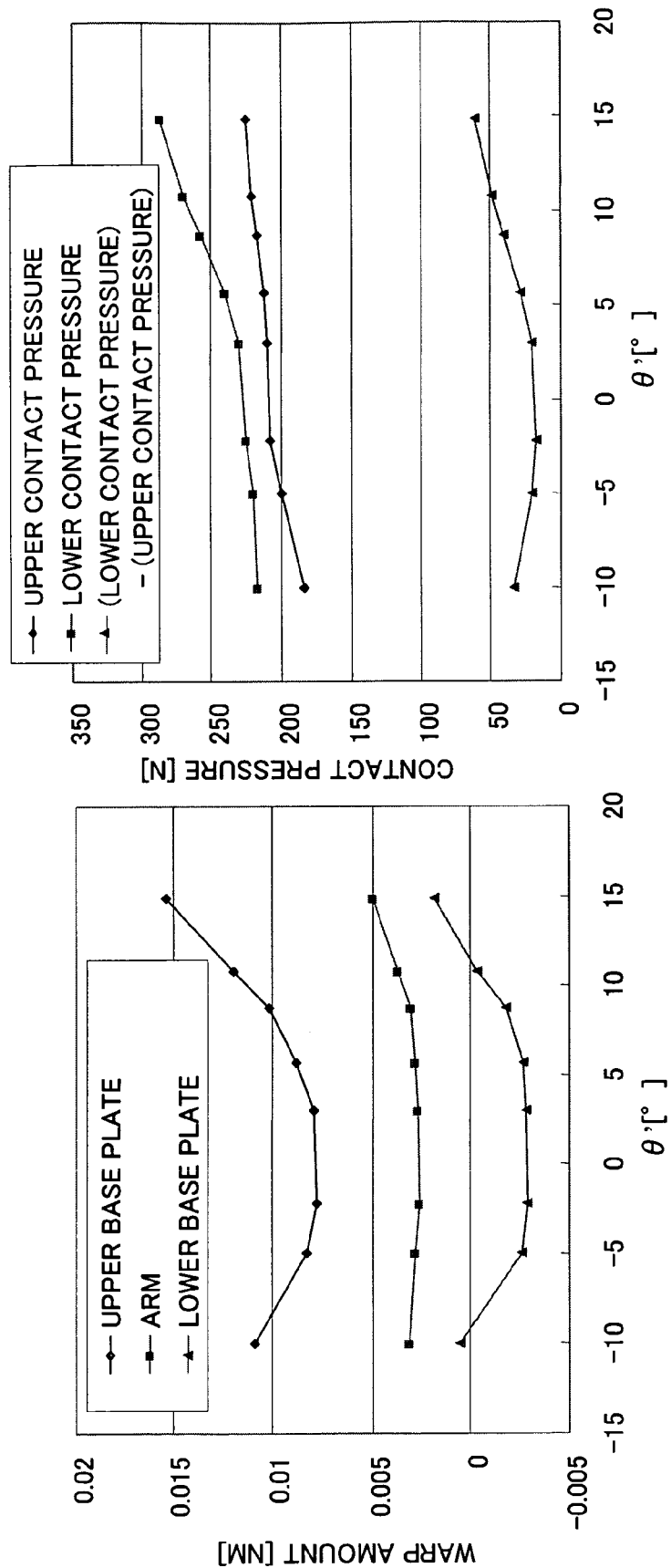
FIGS. 16A and 16B are graphs of results of Example 4.

This example is similar to Example 3 shown in FIG. 13, but different in that a surface has the smallest internal diameter as shown in FIG. 15 and the area having the smallest internal diameter is wider. This example has plural points having the smallest internal diameter in the base plates 150A and 150B, at which the power points $P_2'$ and $P_4'$ can exist. Even in this example, by changing $\theta'$, the warp amounts of the base plates 150A and 150B and the arm 144, the upper and lower contact pressures, and a difference between these contact pressures are studied, and the results are summarized as shown in FIGS. 16A and 16B. The angle $\theta'$ have the same positive and negative directions as the angle $\theta$.

It is understood from FIG. 16A that the arm 144 has an approximately constant warp amount in a range $-10° \leq \theta' \leq 10°$, but $-10° \leq \theta' \leq 0°$ is preferable since $\theta'$ is preferably equal to or smaller than 0. However, the warp amounts of the upper and lower base plates and a difference between the lower and upper contact pressures remarkably vary in the ranges of $\theta \leq -5°$ and $5° \leq \theta'$, $-5° \leq \theta \leq 5°$ is more preferable but $-5° \leq \theta' \leq 0°$ is most preferable since $\theta'$ is preferably equal to or smaller than 0.

In addition, when the stable contact pressure between the base plate 150 and the arm 144 is defined as 200 N, the upper contact pressure becomes 200 N or smaller in the range of $\theta \leq -5°$ and thus $-5° \leq \theta$ is preferable.

EXAMPLE 5

Figure 17B:
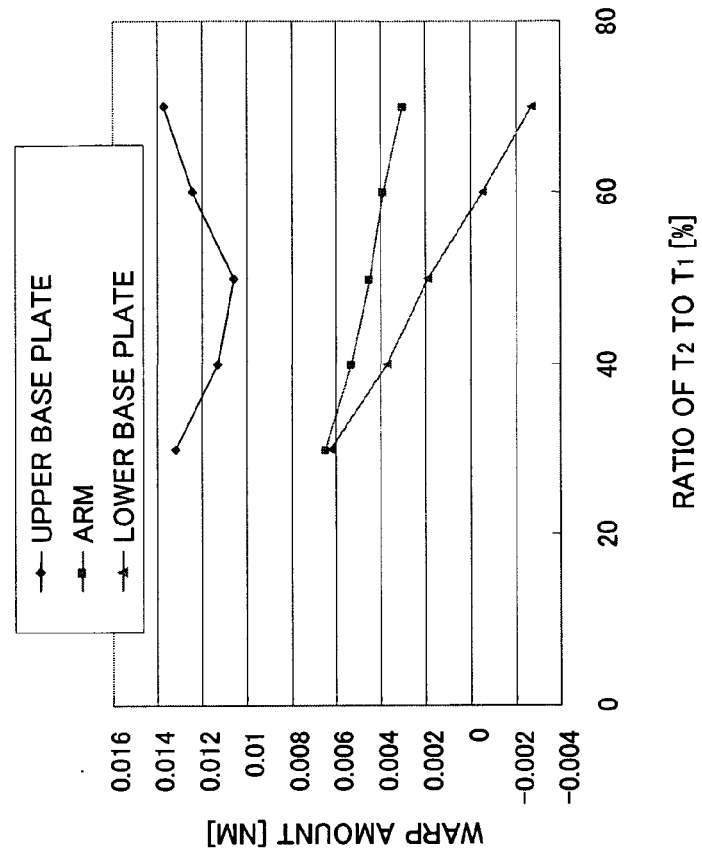
FIG. 17 is a graph of a result of Example 5.
Figure 17A:
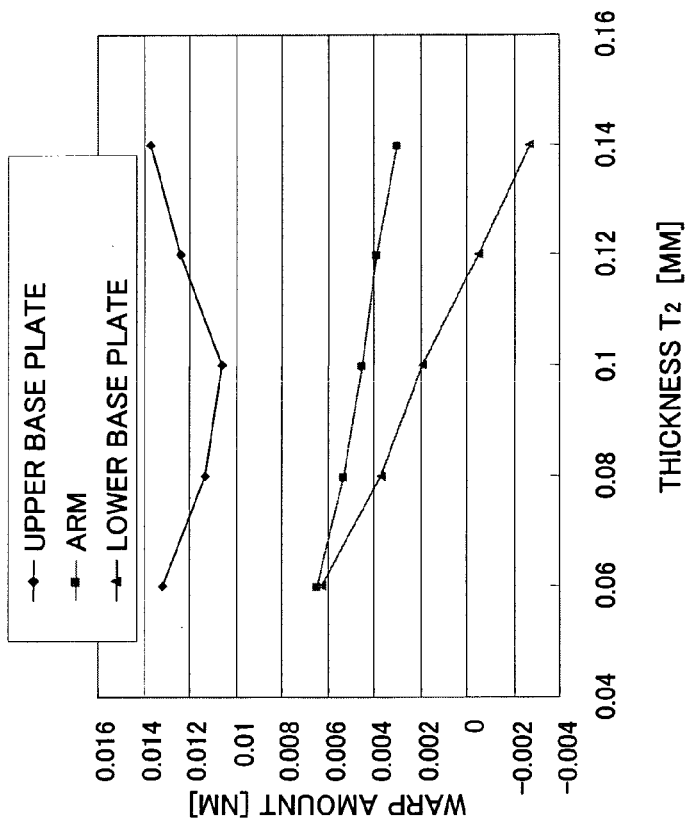

The thickness $T_2$ and a ratio between the thickness $T_1$ and the thickness $T_2$ are varied in the structure shown in FIG. 10B, and the warp amounts of the base plates 150C and 150D and the arm 144 are studied. The results are summarized as shown in FIGS. 17A and 17B. The warp amount of the upper base plate 150C and the warp amount of the lower base plate 150D are a sum of the warp amounts of the base plates and the warp amount of the arm. As the thickness $T_2$ increases, the warp amount decreases since the warp amount of the base plates themselves reduce. However, as the thickness $T_2$ increases, the warp amount of the arm 144 increases. Therefore, the total warp amounts of the base plates 150 resultantly have an extreme point. Referring to FIG. 17A, the total warp amount becomes smallest when the thickness $T_2$ is 0.1 mm (50% of the thickness $T_1$). From FIGS. 17A and 17B, 0.12 mm $\leq T_2 \leq$ 0.07 mm is preferable, but when the manufacturing errors are considered, 0.08 mm $\leq T_2 \leq$ 0.12 mm is more preferable. 35% $\leq T_2/T_1 \leq$ 60% is preferable, but when the manufacturing errors are considered, 40% $\leq T_2/T_1 \leq$ 60% is more preferable.

This example, unlike Japanese Patent Application, Publication No. 7-192420, arranges the thin-walled section within the perforation hole 145 instead of arranging the thin-walled section on the arm 144. When the thin-walled section is arranged on the arm 144 as in Japanese Patent Application, Publication No. 7-192420, the rigidity of the thin-walled section lowers and the lower base plate 150B excessively deforms downwardly especially at the calking time. Accordingly, this example arranges the thin-walled section having the thickness $T_2$ within the perforation hole 145, maintains the flatness of the lower base plate 150B, and prevents the influence of the deformation of the base plate on the suspension 130 during swaging.

The thickness $T_2$ of the boss does not greatly change in the perforation hole 145 before and after swaging. Thus, if $T_2$ and $T_2/T_1$ after swaging satisfy the above conditions, that configuration can be considered to exhibit the operation of the manufacturing method of this embodiment.

EXAMPLE 6

The comparative example uses the configuration shown in FIGS. 12A and 12B before swaging, whereas this example uses a pair of differently shaped base plates in which the upper base plate has a shallower dent and the lower base plate has a deeper dent than those of the comparative example. This example corresponds to FIG. 8 in which $L_{11}$ is made larger and $L_{22}$ is made smaller. Similar to Example 1, a shape shown in FIG. 19 is obtained through simulation that utilizes the FEM by swaging the upper and lower base plates.

Figure 19:
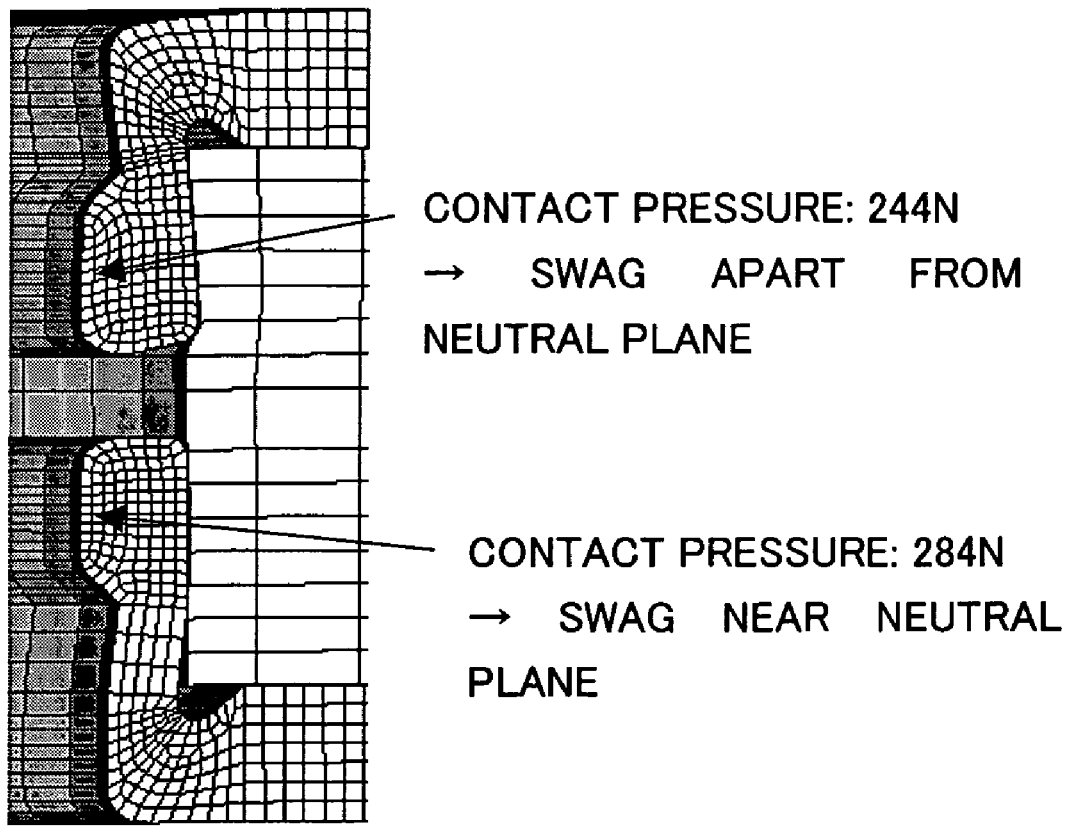
FIG. 19 is a schematic sectional view of base plates according to Example 6 of the present invention after swaging.

As shown in FIG. 19, the upper contact pressure is 244 N and the lower contact pressure is 284 N in this example, whereas the upper contact pressure is 220 N and the lower contact pressure is 266 N in the comparative example. While the contact-pressure difference does not greatly differ between this example and the comparative example, this example keeps the swaged position of the upper base plate (corresponding to $P_{11}$ in FIG. 8) away from the neutral place IS and puts the swaged position of the lower base plate (corresponding to $P_{22}$ in FIG. 8) close to the neutral plane IS. Therefore, as shown in Table 2 below, the arm's warp amount reduces by 70%. Of course, the contact pressure may also be varied with or instead of a distance from the neutral plane IS.

As discussed above, the contact pressure is adjustable, for example, by making the minimum diameter within the perforation hole 145 of the lower base plate smaller than that of the upper base plate, or by forming a boss shape having the same positional relationship among $P_3'$, $P_4'$ and the neutral plane.

TABLE 2

| | POSITION | BEND [um] | ARM'S DISPLACEMENT [μm] |
|---|---|---|---|
| COMPARATIVE EXAMPLE | UP | 12.20 | 3.98 |
| | DN | −0.70 | |
| EXAMPLE 6 | UP | 3.61 | 1.02 |
| | DN | 4.82 | |

EXAMPLE 7

Figure 20:
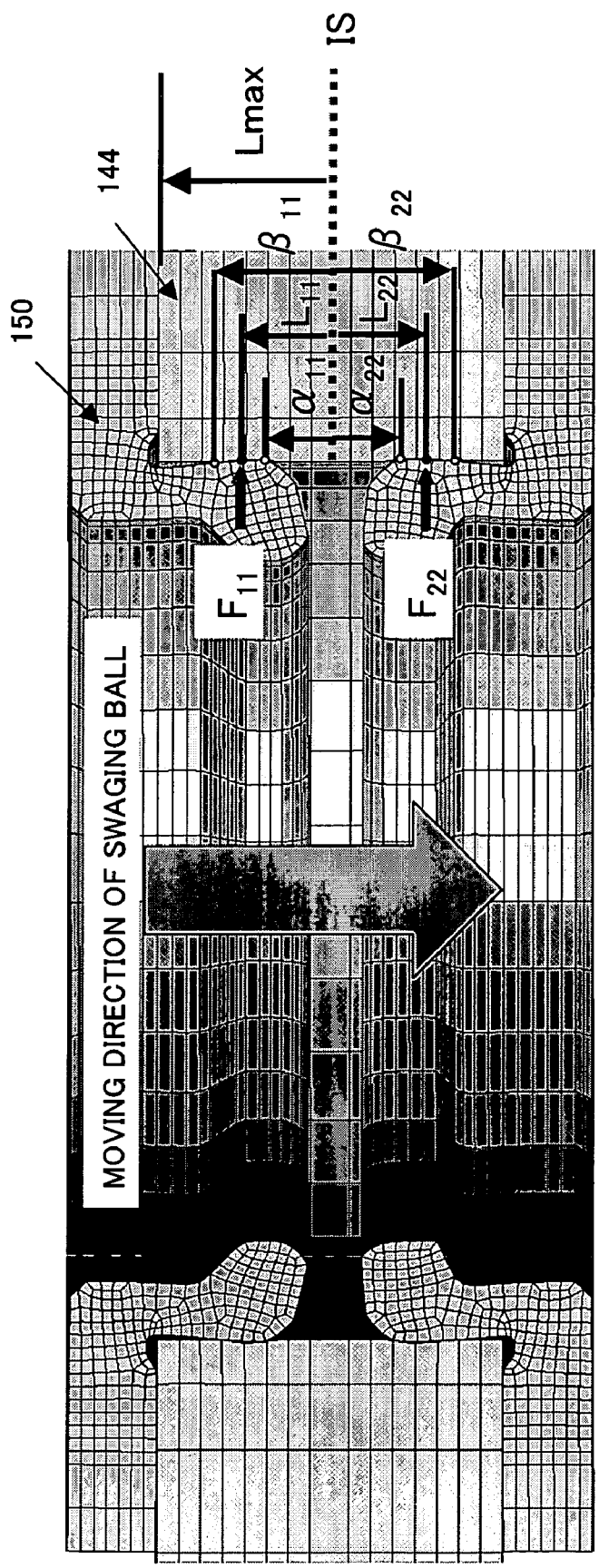
FIG. 20 is a sectional view showing the extended sections of the base plates and the arm according to Example 7 of the present invention after swaging.

A surface contact between the base plate 150 and the arm 144 will be studied in detail. FIG. 20 shows states of the extended section of the base plates and the arm 144 after swaging. Suppose that F denotes a contact pressure generated during swaging, $F_{11}$ denotes the contact pressure of the upstream (or upper) base plate, and $F_{22}$ denotes the contact pressure of the downstream (or lower) base plate along the ball 50's moving direction. The base plate 150 contacts the ball 50 over a range from α to β. An apparent swaging position is defined as an intermediate value of the contact surface between the ball and the boss (or the swaging position L=(α+β)/2). $L_{11}$ denotes a swaging position of the upstream (or upper) base plate, and $L_{22}$ denotes a swaging position of the downstream (or lower) base plate. In FIG. 20, $L_{11}=L_{22}$ is met. The contact pressure meets $F_{11}<F_{22}$. In this case, the moment M given by L×F meets $M_{11}<M_{22}$. Due to this momental unbalance, the arm inclines and the warp amount of the base plate increases. Theoretically, when this phenomenon is considered strictly, the contact pressure is uneven over the contact surface and the moment applied to the arm should be calculated through integration over the contact area. Nevertheless, it is permissible to simply consider the contact pressure constant and evaluate the momental difference using the above approach. The warp amounts of the arm and the base plates can be reduced by improving the momental unbalance.

Figure 21:
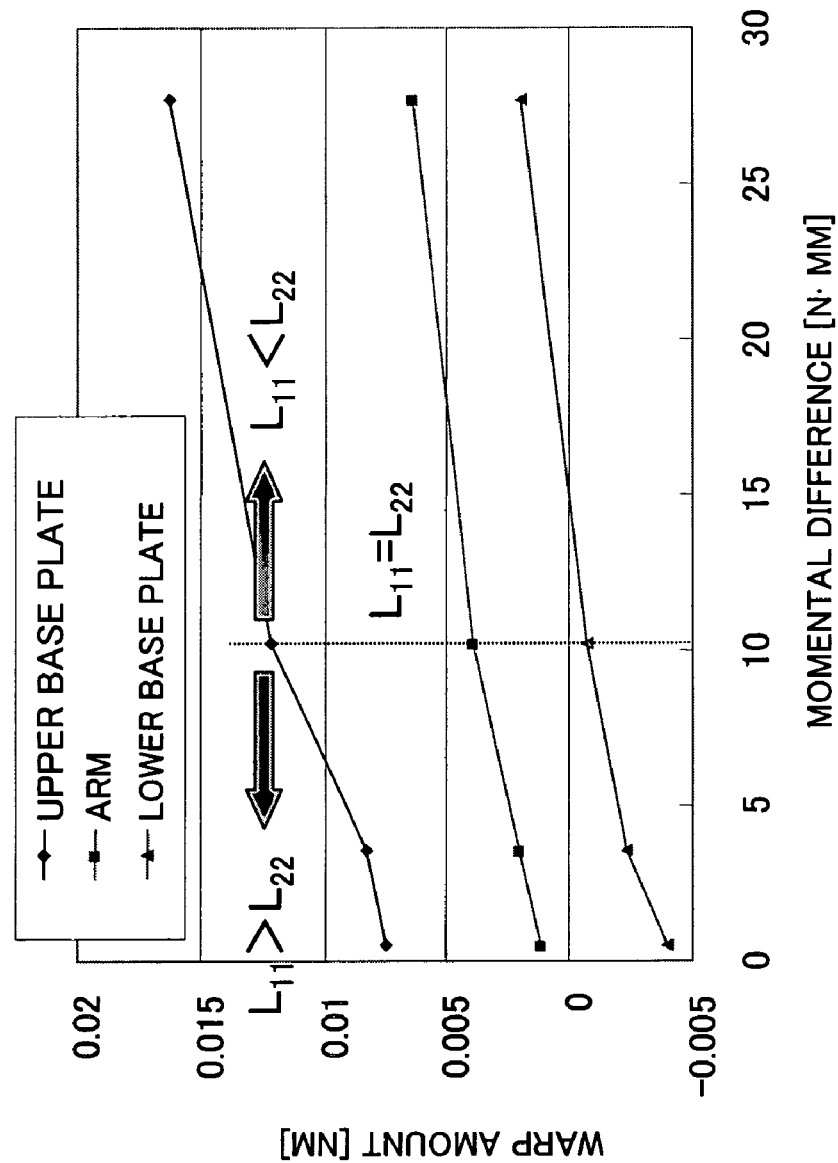
FIG. 21 is a graph showing a relationship between a momental difference and warp amounts according to Example 7 of the present invention.

FIG. 21 shows a warp-amount improvement effect by changing the swaging position L in the upstream and downstream base plates. In FIG. 21, the abscissa axis denotes the momental difference $M_2-M_1$ and the warp amounts of the arm and the base plates are evaluated relative to the momental difference. $L_{11}=L_{22}$ is met at a position where the momental difference is 10 N·mm in FIG. 21. As described above, since $F_{11}<F_{22}$, the lower moment increases and the arm has a warp amount. On the other hand, when $L_{11}<L_{22}$, the momental difference increases and the warp amounts of the arm and the upper and lower base plates increase.

When $L_{11}>L_{22}$, the momental difference reduces and the warp amounts of the arm and the upper and lower base plates decrease. It is clear that $M_{11}=M_{22}$ provides the best solution. $L_{22}/L_{11}$ is an inverse number of $F_{22}/F_{11}$ when $M_{11}=M_{22}$ is met. Where $L_{11}$opt and $L_{22}$opt denote the best combination of L, $0<L_{11}<Lmax$ and $0<L_{22}<Lmax$ are met in the swaged structure in which $L_{11}>L_{22}$. A combination of $L_{11}$ and $L_{22}$ that satisfies $F_{11}/F_{22}\times 0.8 \leq L_{11}/L_{22} \leq F_{11}/F_{22}\times 1.2$ is preferable. Alternatively, $L_{11}$opt−0.02 mm$\leq L_{11} \leq L_{11}$opt+0.02 mm and $L_{22}$opt−0.02 mm$\leq L_{22} \leq L_{22}$opt+0.02 mm are preferable, or $L_{11}$opt×0.8$\leq L_{11} \leq L_{11}$opt×1.2 and $L_{22}$opt×0.8$\leq L_{22} \leq L_{22}$opt×1.2 are preferable.

Figure 22:
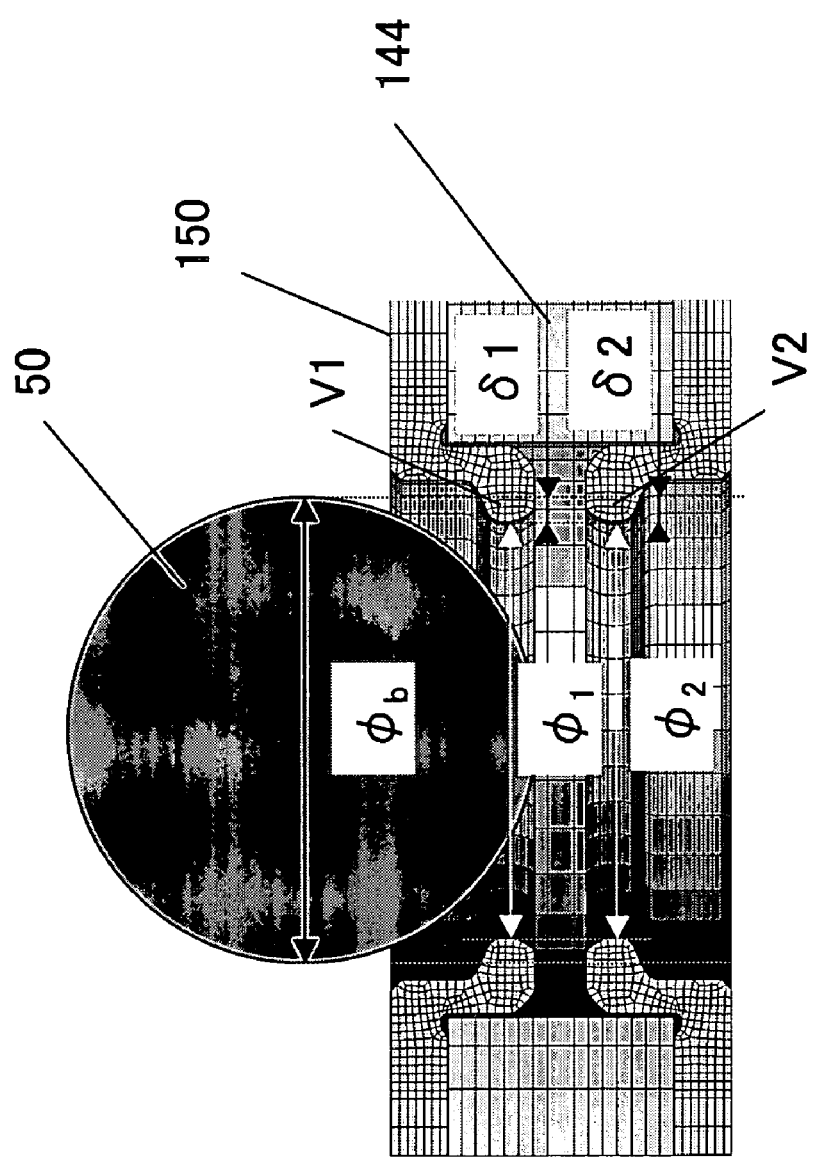
FIG. 22 is a graph for explaining a momental balance improvement.

Referring to FIG. 22, the contact pressure may be increased in order to improve the momental balance. The swaging margin is expressed by $\delta 1=\Phi_1-\Phi_b$ and $\delta 2=\Phi_2-\Phi_b$, where $\Phi_1$ and $\Phi_2$ denote the minimum internal diameter of the extended section of the base plates, and $\Phi_b$ denotes a diameter of the ball. As the swaging margin is greater, the contact pressure increases accordingly. In addition, V1 and V2 are defined as volumes of the base plates 150 inside the diameter $\Phi_b$ of the swaging ball 50. The swaging force increases by increasing these volumes.

Figure 23:
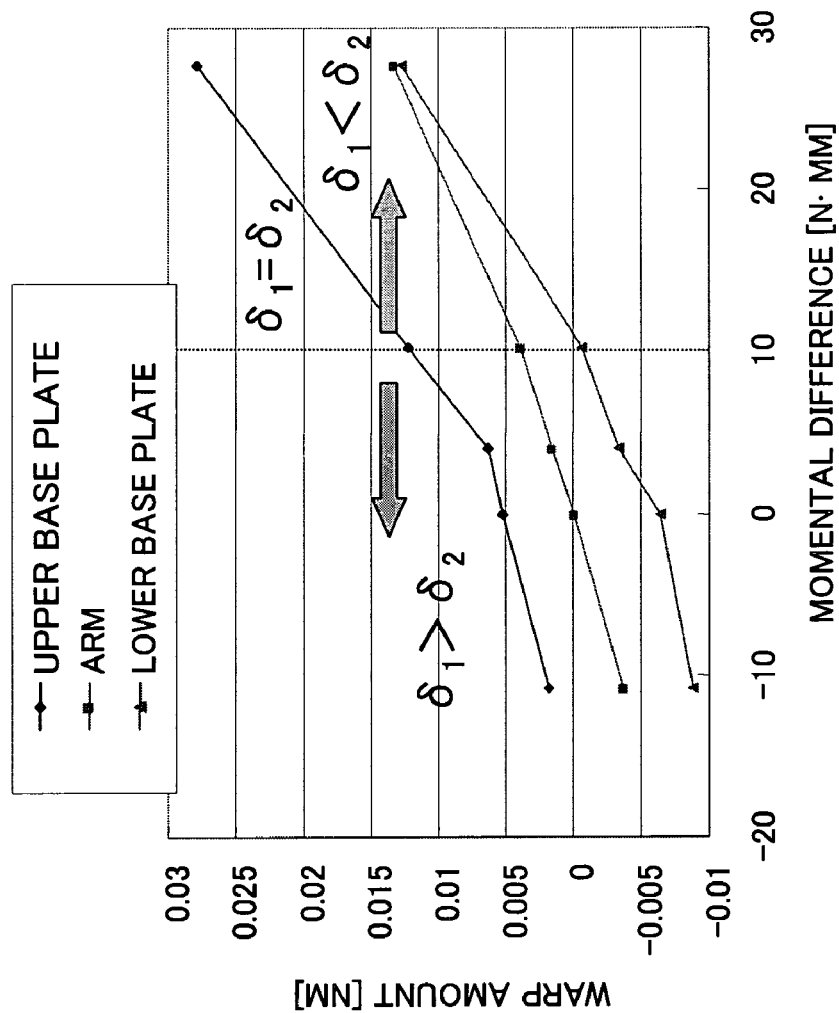
FIG. 23 is a graph showing a relationship between a momental difference and warp amounts according to Example 7 of the present invention.

FIG. 23 is a graph having the abscissa axis of a momental difference $M_{22}-M_{11}$, and evaluates the warp amounts of the arm 144 and the base plates 150 relative to the momental difference when $\Phi_1$ and $\Phi_2$ are varied. Even when the swaging margin is made constant, due to the swaging difference between the upper and lower base plates, the contact pressure meets $F_{11}<F_{22}$. Therefore, the moment of the lower base plate is larger and the arm 144 has a warp amount. When $\Phi_1<\Phi_2$, the momental difference expands and the warp amounts of the arm 144 and the upper and lower base plates increase. When $\Phi_1>\Phi_2$, the momental difference reduces and the warp amounts of the arm 144 and the upper and lower base plates decrease. When both moments are balanced, the arm's deformation becomes minimum. Suppose that the best combination of δ that gives $F_{11}=F_{22}$ are δ1opt and δ2opt. A similar effect of varying the contact pressure is obtained by making V1>V2. A similar effect is obtained by combining $L_{11}>L_{22}$.

In summary, $\Phi_1>\Phi_2$ is preferable. More preferably, δ1opt−0.02 mm<δ1<δ1opt+0.02 mm and δ2opt−0.02 mm<δ2<δ2opt+0.02 mm or δ1opt×0.8<δ1<δ1opt×1.2 and δ2opt×0.8<δ2<δ2opt×1.2 are met.

Alternatively, V1>V2 is preferable. More preferably, V1opt×0.2<V1<V1opt×1.2 and V2opt×0.2<V2<V2opt×1.2 are met. Combinations of δ1>δ2 and L1>L2, V1>V2 and L1>L2, δ1>δ2 and V1>V2 and δ1>δ2, L1>L2 and V1>V2 are also preferable.

Figure 24:
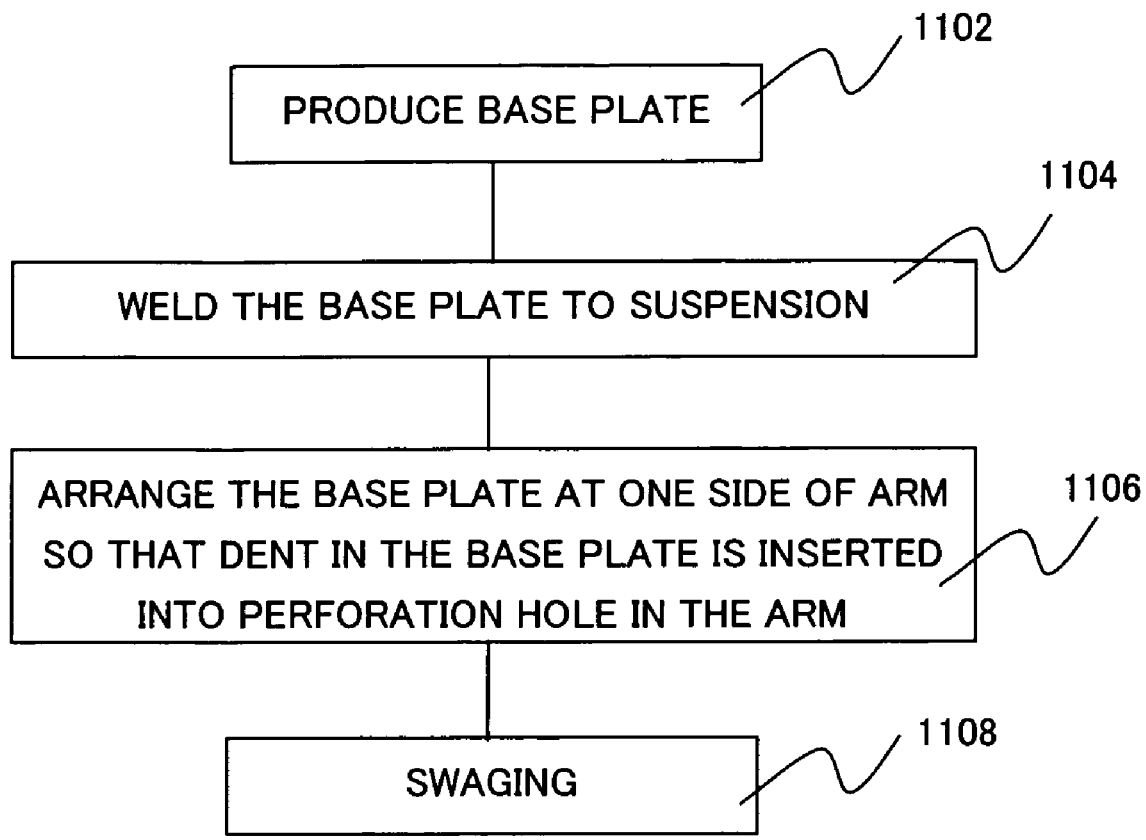
FIG. 24 is a flowchart for explaining a manufacturing method of a structure shown in FIGS. 3A and 3C in which one base plate is swaged with one side of the arm.

Referring now to FIG. 24, a description will be given of a connection between a fourth arm 144 from the top in FIG. 3A and the base plate 150. The fourth arm 144 from the top in FIG. 3A has a single head structure, in which one base plate 150 is attached to one side of the arm 144. Here, FIG. 24 is a flowchart for explaining a connection between the arm 144 and the base plate 150.

First, as shown in FIGS. 5A and 5B, the base plate 150 is produced (step 1102). Similar to step 1002, step 1102 forms the dent 154 in the plate section 151 of the base plate 150 by press work, as shown in FIG. 7. The depth of the dent 154 or the position of the boss 155 is set from a relationship between the neutral plane IS and a swaging position, which will be described below.

Next, similar to step 1004, as shown in FIGS. 4A and 4B, the welded section 152 of the base plate 150 is laser-welded with the suspension 130 (step 1104). The magnetic head part 120 is attached to the suspension 130 before or after step 1104.

Figure 25:
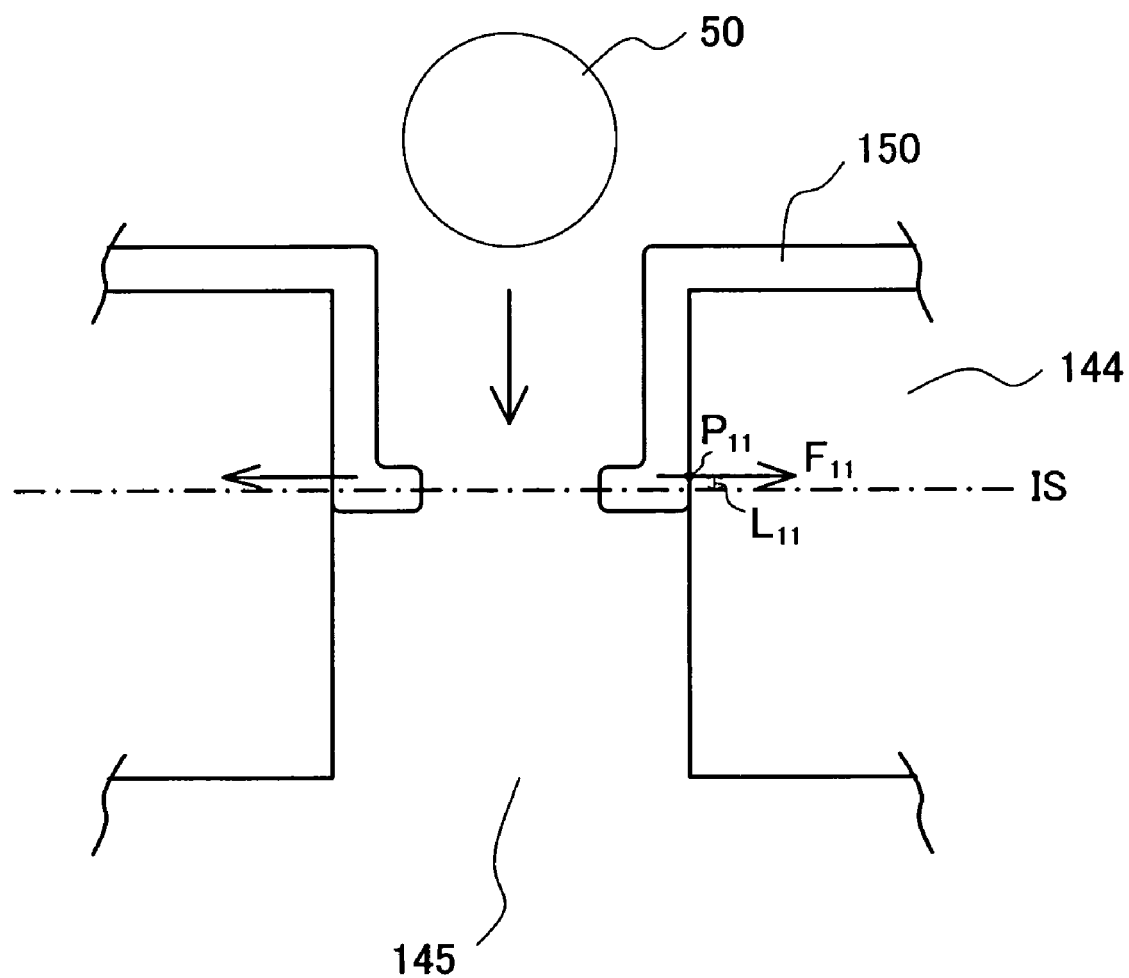
FIG. 25 is a schematic sectional view for explaining swaging of the base plates shown in FIGS. 5A and 5B with one side of the arm.

Next, as shown in FIG. 25, the base plate 150 is arranged at one side of the arm 144 so that the dent 152 of the base plate 150 is inserted into the perforation hole 145 of the arm 144 (step 1106). Here, FIG. 25 shows that the base plate 150 is inserted into one side of the arm 144. This embodiment sets the depth of the dent 154 so that the swaging position of the base plate 150 accords approximately with the neutral plane IS.

Next, swaging follows (step 1108). The swaging passes a swaging ball 50 whose diameter is slightly greater than a diameter of the opening 157, in one direction shown by an arrow through the perforation hole 145, as shown in FIG. 25. As a result, the boss 155 of the base plate 150 crushes and plastically deforms as shown by a horizontal arrow in FIG. 25, thereby jointing the base plate 150 with the arm 144.

The instant inventors have discovered that the conventional base plate warps downwardly because the deformation of the base plate is influenced not only by the base plate 150's own deformation due to the plastic deformation force by the ball 50 but also by the deformation of the arm 144.

Figures 26A, 26B, 26C:
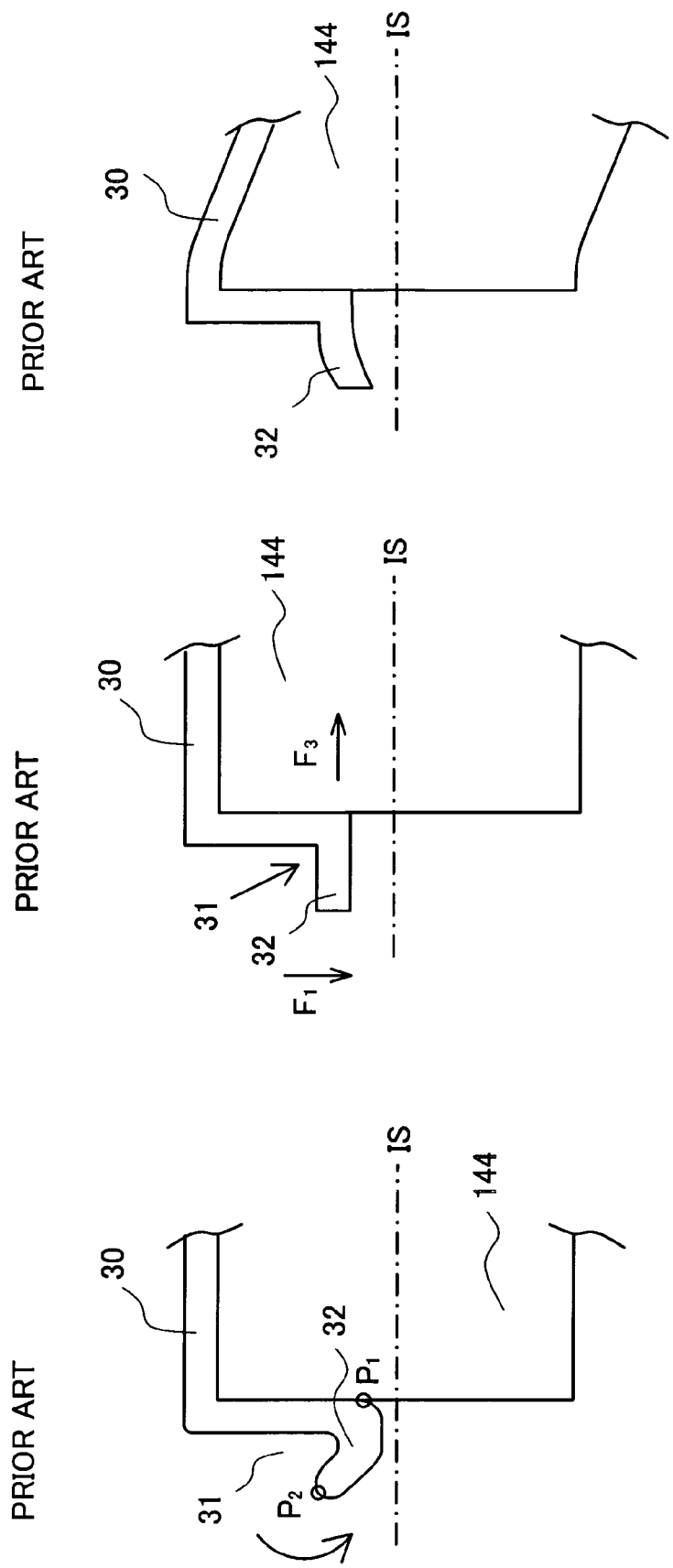
FIGS. 26A to 26C are schematic sectional views of a comparative example that includes the base plates swaged with one side of the arm.

FIG. 26A exaggerates a shape of the conventional base plate 30. More specifically, FIG. 26A is a partially enlarged sectional view of an arrangement between the conventional base plate 30 and the arm 144 before swaging. A position or power point $P_2$ at which the ball 50 first contacts the upper base plate 30 is located above a position or fulcrum $P_1$ at which the base plate 30A contacts the arm 144, i.e., the fulcrum $P_1$ is located closer to the neutral plane IS than the power point $P_2$. This is because when the power point $P_2$ is closer to the neutral plane IS than the fulcrum $P_1$, the upper extended section 32 is likely to deform in the counterclockwise arrow direction rather than against the arm 144 as the ball 50 passes. When the deformation force applied by the ball 50 is consumed for the downward deformation of an extended section 32 and the horizontal deformation reduces, the jointing force or contact pressure applied by a boss 31 to the arm 144 undesirably weakens, and the base plate 30A is likely to separate from the arm 144.

As simply shown in FIG. 26B, when the boss 31 receives a perpendicularly downward force $F_1$ from the ball 50, the boss 31 deforms both downwardly and horizontally. In addition, a contact pressure $F_3$ applies to the arm 144 from the boss 31. Here, FIG. 26B is a partial enlarged sectional view showing the forces applied to the base plate 30 due to swaging and the amount of the contact pressure to the arm 144 from the base plate 30.

From the contact pressure $F_3$ around the neutral plane IS, the arm 144 receives the counterclockwise moment in FIG. 26B, and deforms downwardly as shown in FIG. 26C. The base plate 30 follows the arm 144 and deforms downwardly. This deformation of the arm 30 is caused by the arm 144. The base plate 30 itself deforms due to its extended section 32 caused by the force $F_1$. As a result, the deformation of the base plate 30 is a superposition between its own deformation and the deformation caused by the arm 144. Here, FIG. 26C is a partial enlarged sectional view showing deformations of the base plate 30 and the arm 144 after swaging.

In order to reduce the deformation of the base plate 30 due to the deformation of the arm 144, the instant inventors have studied a structure that minimizes the moment applied to the arm 144 around the neutral plane IS. In other words, in FIG. 25, this embodiment sets $L_{11}$ to approximately zero and zeros a moment $M_1 = F_{11} \times L_{11}$ applied from the boss 155 of the base plate 150 to the arm 144 around the neutral plane IS, where $F_{11}$ is a contact pressure applied from the boss 155 of the base plate 150 to the arm 144, and $L_{11}$ is a distance between the swaging point $P_{11}$ to which the contact pressure $F_{11}$ is applied and the neutral plane IS. Thereby, the moment applied to the arm 144 becomes zero, and the arm 144's deformation becomes small.

Figure 27:
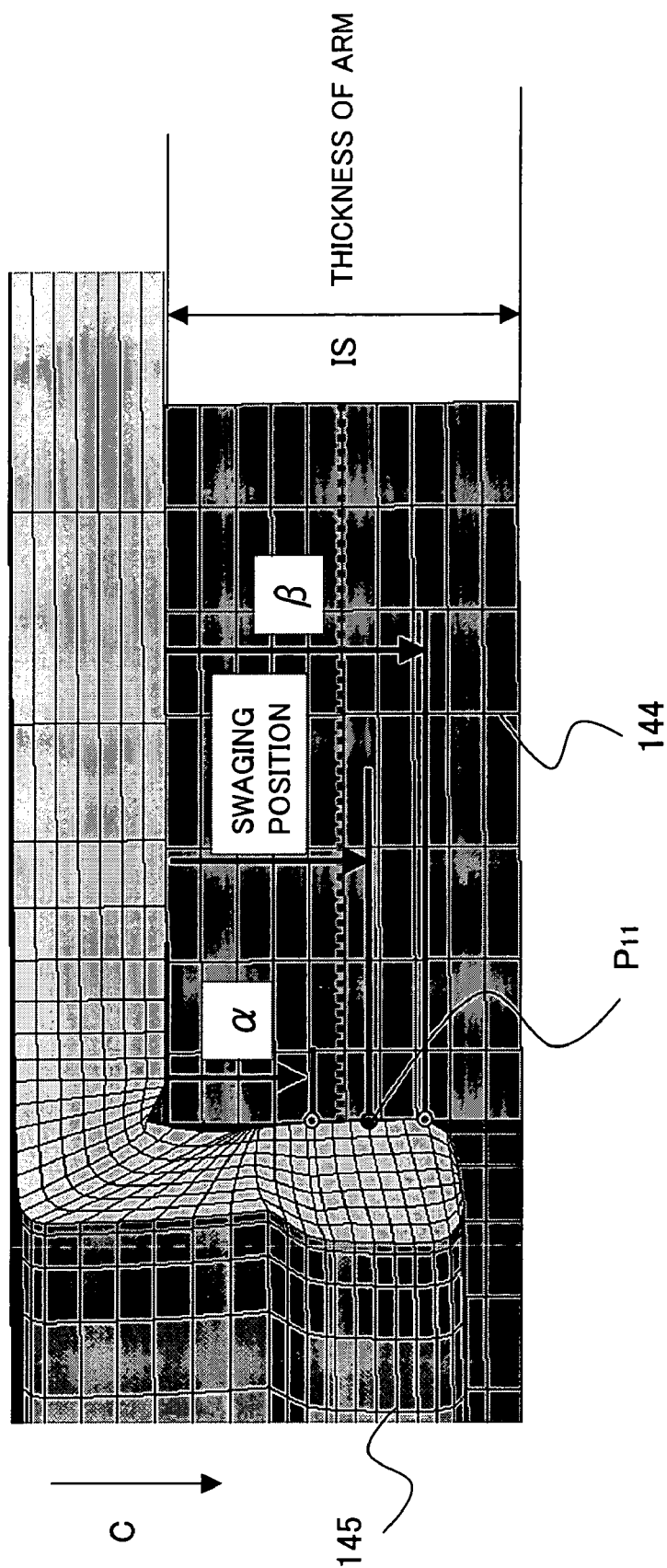
FIG. 27 is a partially enlarged sectional view of the base plate swaged with the arm shown in FIG. 25.

However, as shown in FIG. 27, the base plate 150 can be swaged with the arm 144 through its surface. Here, FIG. 27 is a partial enlarged sectional view of the base plate 150 swaged with the arm 144, with respect to a section that includes a center axis of the perforation hole 145 of the arm 144. The swaging position $P_{11}$ is an intermediate position between the most upstream position a and the most downstream position β along the swaging direction C (or moving direction of the swaging ball 50) among contact positions between the base plate 150 and the arm 144.

Figure 28:
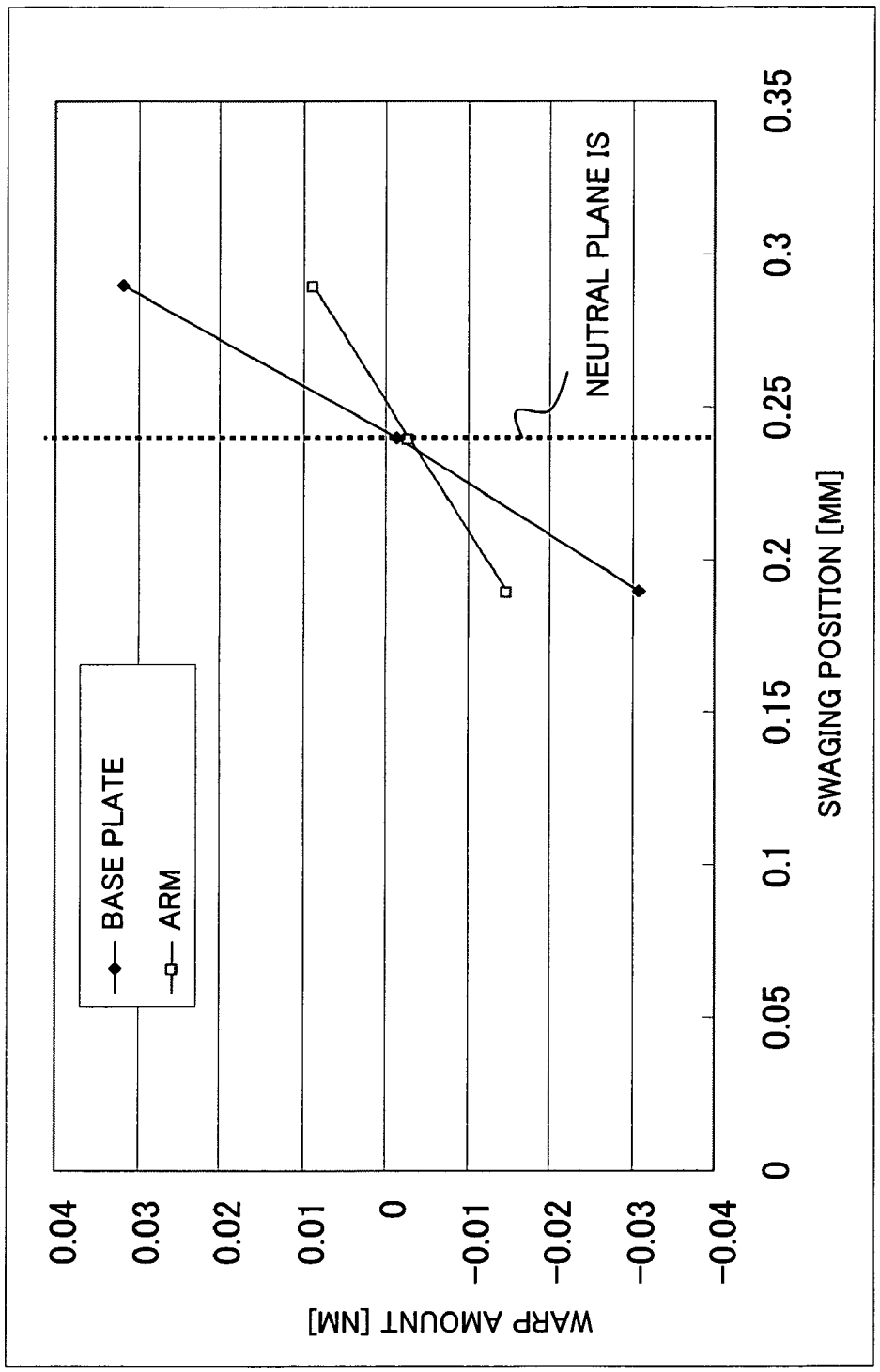
FIG. 28 is a graph showing a relationship among a distance between a swaging position on the base plate and the neutral plane in FIG. 27, and warp amounts.

FIG. 28 shows a relationship between the swaging position from the neutral plane and the warp amount. From FIG. 28, when the swaging position accords with the neutral plane, the warp amounts of the arm 144 and the base plate 150 become minimum. As shown in FIG. 27, the contact surface between the boss 155 and the arm 144 crosses the neutral plane IS over the position a and the position β in this embodiment. The arm has a thickness of 0.048 mm in FIG. 27 in this embodiment. From FIG. 28, when the swaging position is set in a range of ±0.05 mm from the neutral plane IS, the warp amount is maintained to be a permissible range of about ±0.01 mm. The range of ±0.05 mm corresponds to a range of about ±10% of the thickness of the arm (±0.048 mm). However, when the manufacturing errors of the base plate 150 are considered, the swaging position is preferably set in a range of about ±5% of the thickness of the arm (±0.024 mm).

While the above embodiment describes the single head structure in the fourth arm 144 from the top in FIG. 3A, the above is true of the top arm 144 in FIG. 3A.

Figure 18:
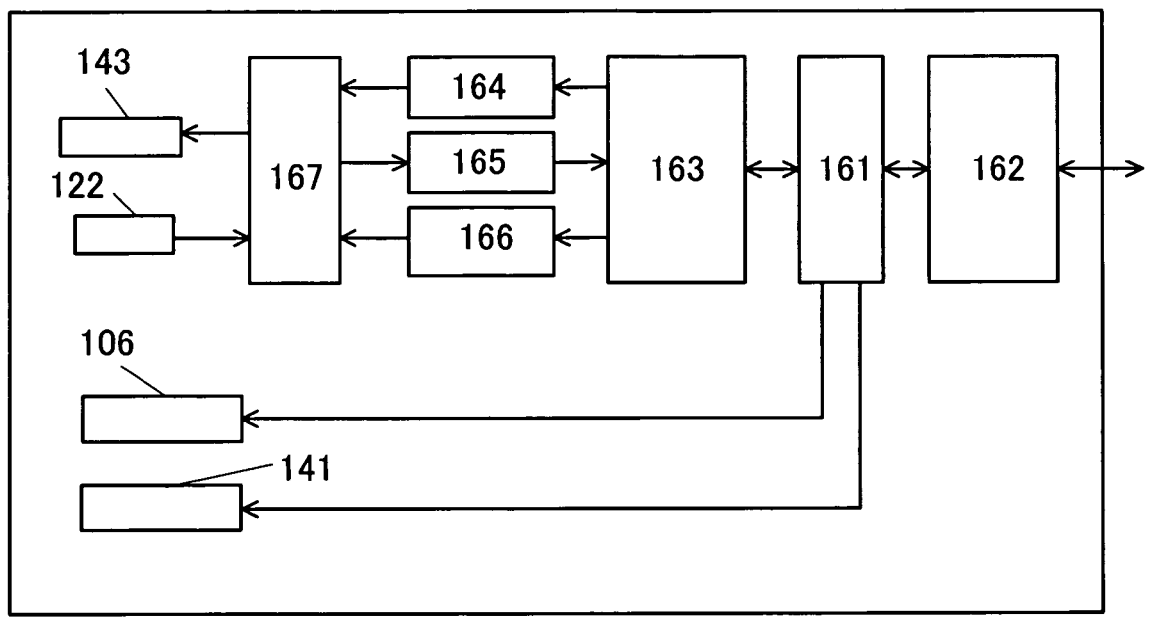
FIG. 18 is a block diagram of a control system in the HDD shown in FIG. 1.

FIG. 18 shows a control block diagram of a control system 160 in the HDD 100. The control system 160 is a control illustration in which the head 122 has a inductive head and an MR head. The control system 160, which can be implemented as a control board in the HDD 100, includes a controller 161, an interface 162, a hard disc controller (referred to as "HDC" hereinafter) 163, a write modulator 164, a read demodulator 165, a sense-current controller 166, and a head IC 167. Of course, they are not necessarily integrated into one unit; for example, only the head IC 167 is connected to the carriage 140.

The controller 161 covers any processor such as a CPU and MPU irrespective of its name, and controls each part in the control system 160. The interface 162 connects the HDD 100 to an external apparatus, such as a personal computer ("PC" hereinafter) as a host. The HDC 163 sends to the controller 161 data that has been demodulated by the read demodulator 165, sends data to the write modulator 164, and sends to the sense-current controller 166 a current value as set by the controller 161. Although FIG. 18 shows that the controller 161 provides servo control over the spindle motor 106 and (a motor in) the carriage 140, the HDC 163 may serve as such servo control.

The write modulator 164 modulates data and supplies data to the head IC 162, which data has been supplied, for example, from the host through the interface 162 and is to be written down onto the disc 104 by the inductive head. The read demodulator 165 demodulates data into an original signal by sampling data read from the disc 104 by the MR head device. The write modulator 164 and read demodulator 165 may be recognized as one integrated signal processing part. The head IC 167 serves as a preamplifier. Each part may apply any structure known in the art, and a detailed description thereof will be omitted.

In operation of the HDD 100, the controller 161 drives the spindle motor 106 and rotates the disc 104. The airflow associated with the rotation of the disc 104 is introduced between the disc 104 and slider 121, forming a minute air film and thus generating the buoyancy that enables the slider 121 to float over the disc surface. The suspension 130 applies an elastic compression force to the slider 121 in a direction opposing to the buoyancy of the slider 121. The balance between the buoyancy and the elastic force spaces the magnetic head part 120 from the disc 104 by a constant distance. As discussed above, the warp amount of the base frame 150 is restrained, and the elastic compression force applied from the suspension 130 and orientation, flying height and vibration tolerance etc. of the slider 121 are close to the designed values. Therefore, highly precise positioning of the head 122 is available while the crushes are prevented.

The controller 161 then controls the carriage 140 and rotates the carriage 140 around the support shaft 142 for head 122's seek for a target track on the disc 104. While this embodiment thus uses a swing arm type in which the slider 121 draws an arc locus around the support shaft 142, the present invention is applicable to a linear type in which the slider 121 draws a linear locus.

In writing, the controller 161 receives data from the host (not shown) such as a PC through the interface 162, selects the inductive head device, and sends data to the write modulator 164 through the HDC 163. In response, the write modulator 164 modulates the data, and sends the modulated data to the head IC 167. The head IC 167 amplifies the modulated data, and then supplies the data as write current to the inductive head device. Thereby, the inductive head device writes down the data onto the target track.

In reading, the controller 161 selects the MR head device, and sends the predetermined sense current to the sense-current controller 166 through the HDC 163. In response, the sense-current controller 166 supplies the sense current to the MR head device through the head IC 167. Thereby, the MR head reads desired information from the desired track on the disc 104.

Data is amplified by the head IC 167 based on the electric resistance of the MR head device varying according to a signal magnetic field, and then supplied to the read demodulator 165 to be demodulated to an original signal. The demodulated signal is sent to the host (not shown) through the HDC 163, controller 161, and interface 162.

Thus, the above embodiments can provide a HSA, its manufacturing method, and a magnetic disc having the HSA, which effectively restrain the deformation of the arm, and/or which effectively restrain the deformation of the base plate itself due to swag.

Further, the present invention is not limited to these preferred embodiments, and various modifications and variations may be made without departing from the spirit and scope of the present invention. For example, while the above embodiments discuss the HDD, the present invention is applicable to other types of magnetic disc drives, such as a photomagnetic disc drive.

What is claimed is:

1. A method for manufacturing a head stack assembly that includes a pair of suspensions each of which supports a head, an arm that drives the head, and a pair of base plates that attach the pair of suspensions to both sides of the arm that has a perforation hole, each of the pair of base plates having a boss with an opening, said method comprising the step of swaging the pair of base plates with the arm by passing, in one direction, a processing member larger than the opening through the perforation hole and the base plates while the pair of base plates are being inserted into the perforation hole at both sides of the perforation hole, wherein where a neutral plane is defined as a plane that halves a thickness of the arm and is perpendicular to a section that includes a center axis of the perforation hole, a first position is defined as a position that has a minimum internal diameter of the base plate, and a second position is defined as a position closest to the neutral plane among contact positions between the base plates and the arm, a distance between the neutral plane and the first position is equal to or smaller than a distance between the neutral plane and the second position before said swaging step.

2. A method according to claim 1, wherein the first position is defined as an intermediate position between the farthest position from the neutral plane and the closest position to the neutral plane among positions that have the minimum internal diameter where the positions have the minimum internal diameter of the base plate form a surface.

3. A method according to claim 1, wherein .theta. satisfies the following equation:

$$-17° \leq \theta \leq 0°$$

where θ is an angle between a line that passes the second position on the section where a direction going away from the neutral plane is positive and is parallel to the neutral plane and a line that connects the first and second positions to each other.

4. A method according to claim 1, wherein 0 satisfies the following equation:

$$-12° \leq \theta \leq 0°$$

where θ is an angle between a line that passes the second position on the section where a direction going away from the neutral plane is positive and is parallel to the neutral plane, and a line that connects the first and second positions to each other.

5. A method according to claim 1, wherein the base plate among the pair of base plates, which is Located downstream along the one direction, deforms in an upstream direction along the one direction during said swaging step.

6. A method according to claim 1, wherein the pair of base plates have the same shape before said swaging step.

7. A head stack assembly comprising:
a pair of suspensions each of which supports a head;
an arm that drives the head and has a perforation hole; and
a pair of base plates, swaged with both sides of the perforation bole of said arm, which attach said pair of suspensions to both sides of said arm,
wherein a larger distance between the closest points of said pair of base plates to a neutral plane that halves a thickness of said arm, and the closest position to the neutral plane among contact positions between said base plates and said arm is 130% of a smaller distance or smaller.

8. A head stack assembly according to claim 7, wherein the larger distance is 115% of the smaller distance or smaller.

9. A magnetic disc drive comprising a head stack assembly manufactured by a method according to claim 1.

10. A magnetic disc drive comprising a head stack assembly according to claim 7.

11. A method for manufacturing a head stack assembly that includes a suspension that supports a head, an arm that drives the head, and a base plate that has a boss with an opening and attaches the suspension to the arm that has a perforation hole, the base plate, said method comprising the step of swaging the pair of base plates with the arm by passing, in one direction, a processing member larger than the opening through the perforation hole and the base plate while the base plate is being inserted into the perforation hole, wherein the smallest thickness of the boss perpendicular to the one direction within the perforation hole is 60% or smaller of a thickness of the base plate outside the perforation hole in a section that includes a center axis of the perforation hole before said swaging step.

12. A method according to claim 11, wherein the smallest thickness of the boss perpendicular to the one direction within the perforation hole is 35% or greater of the thickness of the base plate outside the perforation hole.

13. A method according to claim 11, wherein the smallest thickness of the boss perpendicular to the one direction within the perforation hole is 40% or greater of the thickness of the base plate outside the perforation hole.

14. A method according to claim 11, wherein the smallest thickness of the boss in the perforation hole is about 50% of the thickness of the base plate outside the perforation hole or greater.

15. A. method according to claim 11, wherein where a neutral plane is defined as a plane that halves a thickness of the arm and is perpendicular to the section, a first position is defined as a position that has a minimum internal diameter of the base plate and is farthest from the neutral position, and a second position is defined as a position that is closest to the neutral plane among contact positions between the base plate and the arm, a distance between the neutral plane and the first position is smaller than a distance between the neutral plane and the second position before said swaging step.

16. A head stack assembly comprising:
a suspension that supports a bead;
an arm that drives the head and has a perforation hole; and
a base plate, swaged onto the perforation hole of said arm, which has a boss with an opening and attaches the suspension to said arm,
wherein in a section that includes a center axis of said perforation hole, the smallest thickness of the boss perpendicular to the center axis within the perforation hole is 60% of a thickness of said base plate outside the perforation hole or smaller.

17. A head stack assembly according to claim 16, wherein the smallest thickness of the boss perpendicular to the center axis within the perforation hole is 35% or greater of the thickness of the base plate outside the perforation hole.

18. A head stack assembly according to claim 16, wherein the smallest thickness of the boss perpendicular to the center axis within the perforation hole is 40% or greater of the thickness of the base plate outside the perforation hole.

19. A magnetic disc drive comprising a head stack assembly manufactured by a method according to claim 11.

20. A magnetic disc drive comprising a head stack assembly according to claim 16.

21. A method for manufacturing a head stack assembly that includes a pair of suspensions each of which supports a head, an arm that drives the head, and a pair of base plates that attach the pair of suspensions to both sides of the arm that has a perforation hole, each. of the pair of base plates having a boss with an opening, said method comprising the step of swaging the pair of base plates with the arm by passing, in one direction, a processing member larger than the opening through the perforation hole and the base plates while the pair of base plates are being inserted into the perforation hole at both sides of the perforation hole,
wherein where a neutral plane is defined as a plane that halves a thickness of the arm, a moment around the neutral plane applied from the pair of base plates to the arm after said swaging step is smaller than a moment around the neutral plane applied to the arm from a structure that has arranged an upstream base plate among the pair of base plates along the one direction symmetrically with respect to the neutral plane instead of a downstream base plate and has been swaged by the processing member.

22. A method according to claim 21, wherein the smallest internal diameter of the upstream base plate among the pair of base plates is smaller than the smallest internal diameter of the downstream base plate before said swaging step.

23. A method according to claim 21, wherein before said swaging step, in a section that includes a center axis of the perforation hole, where a first position is defined as a position on the base plate which first contacts the processing member, and a second position is defined as one of contact positions between the base plate and the arm, the second position is closer to the neutral plane than the first position on the upstream base plate and the first position is closer to the neutral plane than the second position on the downstream base plate.

24. A method according to claim 21, wherein before said swaging step, a distance between the neutral plane and a contact point between the arm and the upstream base plate among the pair of base plates is longer than a distance between the neutral plane and a contact point between the downstream base plate and the arm.

25. A method according to claim 21, wherein in a section that includes a center axis of the perforation hole before said swaging step, a minimum thickness of the boss perpendicular to the center axis within the perforation hole is 60% of a thickness of the base plate outside the perforation hole or smaller.

26. A magnetic disc drive comprising a head stack assembly manufactured by a method according to claim 21.

* * * * *